US 11,580,374 B2

(12) United States Patent
Cappy et al.

(10) Patent No.: US 11,580,374 B2
(45) Date of Patent: Feb. 14, 2023

(54) ARTIFICIAL NEURON

(71) Applicants: UNIVERSITE DE LILLE, Lille (FR); CENTRE NATIONAL DE LA RECHERCHE SCIENTIFIQUE, Paris (FR)

(72) Inventors: Alain Cappy, Genech (FR); Francois Danneville, Lille (FR); Virginie Hoel, Lomme (FR); Christophe Loyez, Festubert (FR)

(73) Assignees: UNIVERSITE DE LILLE, Lille (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 1124 days.

(21) Appl. No.: 16/092,649

(22) PCT Filed: Apr. 7, 2017

(86) PCT No.: PCT/EP2017/058339
§ 371 (c)(1),
(2) Date: Oct. 10, 2018

(87) PCT Pub. No.: WO2017/178352
PCT Pub. Date: Oct. 19, 2017

(65) Prior Publication Data
US 2019/0130258 A1 May 2, 2019

(30) Foreign Application Priority Data

Apr. 11, 2016 (FR) ..................................... 1653175

(51) Int. Cl.
*G06N 3/06* (2006.01)
*G06N 3/063* (2023.01)
*G06N 3/049* (2023.01)

(52) U.S. Cl.
CPC ........... *G06N 3/0635* (2013.01); *G06N 3/049* (2013.01); *G06N 3/063* (2013.01)

(58) Field of Classification Search
CPC ....... G06N 3/0635; G06N 3/049; G06N 3/063
See application file for complete search history.

(56) References Cited

U.S. PATENT DOCUMENTS 4,771,196 A * 9/1988 Mead ....................... G06G 7/60
327/277
5,355,435 A * 10/1994 DeYong ................. G06N 3/049
706/26

(Continued)

FOREIGN PATENT DOCUMENTS

EP      2 819 068 A2    12/2014
JP      5-114294 A       5/1993
JP      2007-4514 A      1/2007

OTHER PUBLICATIONS

Fukasawa et al., Activities of Excitatory Cells of Neuron and Unicellular Organism, 2015, 6 pages.*

(Continued)

*Primary Examiner* — Omar F Fernandez Rivas
*Assistant Examiner* — Tri T Nguyen
(74) *Attorney, Agent, or Firm* — Oblon, McClelland, Maier & Neustadt, L.L.P.

(57) ABSTRACT

An artificial neuron including: a membrane capacitor; an input of an external synaptic excitation in current, the membrane capacitor integrating the input current; a negative-feedback impulse circuit, supplied by a power supply at a negative voltage between −200 mV and 0 mV and at a positive voltage between 0 mV and +200 mV, including: a bridge based on pMOS and nMOS transistors in series and linked by a midpoint to the membrane capacitor, the midpoint defining the output of the artificial neuron, at least one delay capacitor between the gate and the source of one of the (Continued)

transistors of the bridge, at least two CMOS inverters between the membrane capacitor and the gates of the transistors of the bridge.

30 Claims, 24 Drawing Sheets

(56) References Cited

U.S. PATENT DOCUMENTS

| | | | |
|---|---|---|---|
| 5,386,149 A | 1/1995 | Arima | |
| 5,386,152 A * | 1/1995 | Naraki | H03K 17/223 327/143 |
| 5,530,266 A * | 6/1996 | Yonehara | G02F 1/13454 257/72 |
| 5,615,305 A * | 3/1997 | Nunally | G06N 3/0635 706/35 |
| 6,242,988 B1 * | 6/2001 | Sarpeshkar | G06N 3/049 331/111 |
| 8,504,503 B1 * | 8/2013 | Poon | G06N 3/049 706/33 |
| 2005/0240782 A1 * | 10/2005 | Hubert | G06F 21/755 713/300 |
| 2006/0294034 A1 | 12/2006 | Fuji | |
| 2007/0288668 A1 | 12/2007 | Fiske | |
| 2010/0204766 A1 * | 8/2010 | Zdeblick | A61N 1/056 607/119 |
| 2011/0291670 A1 * | 12/2011 | Barnard | G01N 27/07 324/601 |
| 2012/0011091 A1 * | 1/2012 | Aparin | G06N 3/049 706/33 |
| 2012/0274390 A1 * | 11/2012 | Chen | H03K 17/28 327/519 |
| 2014/0192600 A1 * | 7/2014 | Kang | G11C 16/045 365/185.21 |
| 2014/0358834 A1 * | 12/2014 | Kim | G11C 13/0007 706/25 |
| 2015/0335659 A1 * | 11/2015 | Jones | A61K 31/57 424/9.2 |
| 2016/0042271 A1 * | 2/2016 | Yoon | G06N 3/04 706/25 |
| 2016/0379110 A1 * | 12/2016 | Eleftheriou | G06N 3/0635 706/33 |

OTHER PUBLICATIONS

International Search Report and Written Opinion of the International Searching Authority dated Jun. 30, 2017 in PCT/EP2017/058339 (with English translation), 23 pages.

Giacomo Indiveri, "Neuromorphic Electronic Circuits as Key Enablers of Autonomous Cognitive Agents" 2016 Neuro-Inspired Computational Elements (NICE), XP055351085, Mar. 8, 2016, 33 Pages.

Elisabetta Chicca, et al., "Neuromorphic Electronic Circuits for Building Autonomous Cognitive Systems" Proceedings of the IEEE, vol. 102, No. 9, XP011556825, 2014, pp. 1367-1388.

Chenyuan Zhao, et al., "Spike-Time-Dependent Encoding For Neuromorphic Processors" ACM Journal on Emerging Technologies in Computing Systems, vol. 12, No. 3, XP058073235, Sep. 21, 2015, pp. 1-21.

A. Van Schaik, "Building Blocks for Electronic Spiking Neural Networks" Neural Networks, vol. 14, No. 6-7, XP004310067, Jul. 9, 2001, pp. 617-628.

Japanese Office Action dated May 11, 2020 in Patent Application No. 2019-5015773 (with English translation), 6 pages.

* cited by examiner

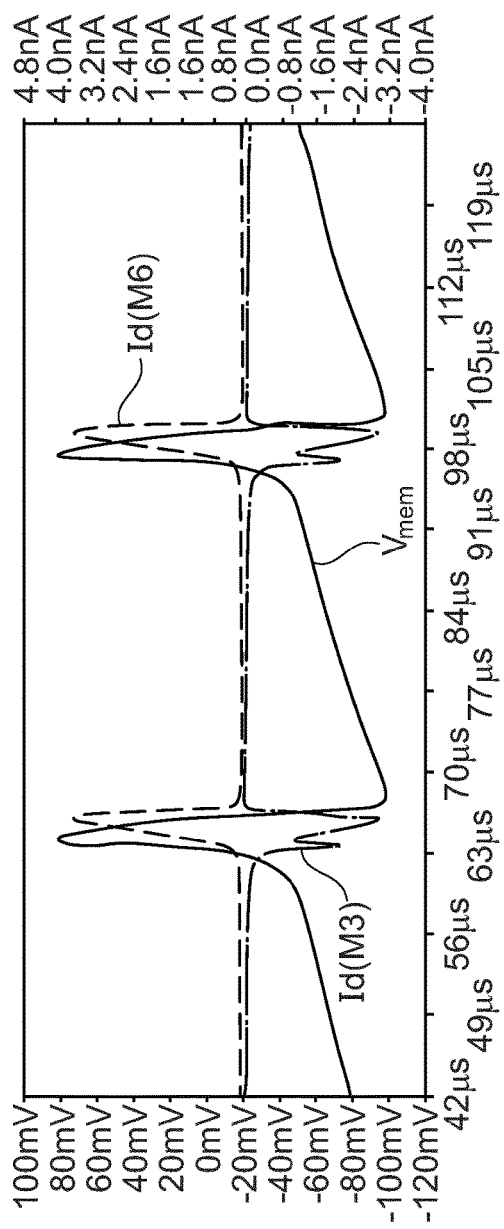
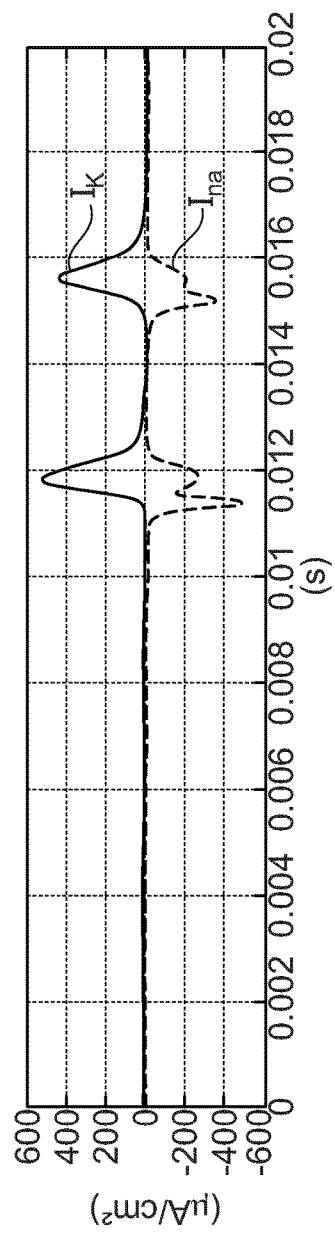
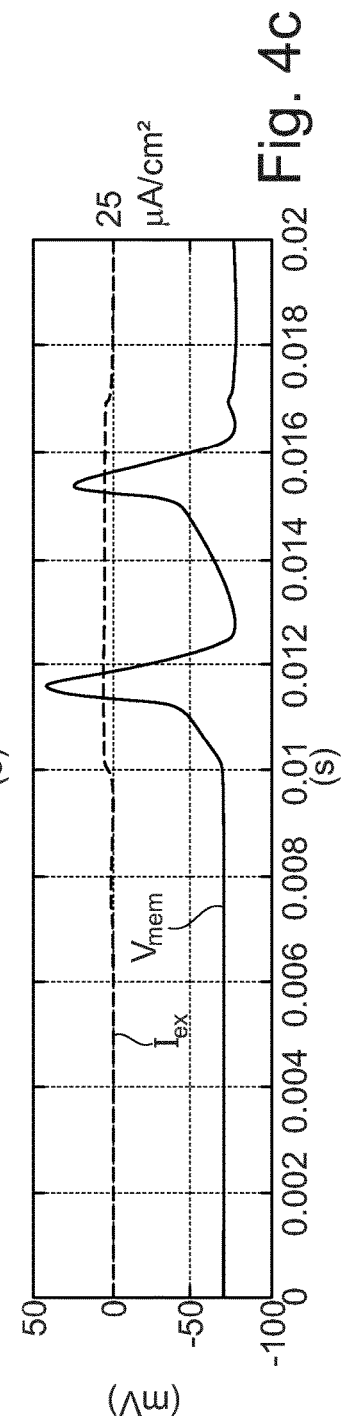
Fig. 4b
Fig. 4c

ARTIFICIAL NEURON

BACKGROUND OF THE INVENTION

1. Field of the Invention

The subject matter of the present invention is a low energy consumption circuit capable of reproducing certain electrical properties of a biological neuron and particularly able to be used in bioinspired architectures.

2. Discussion of the Background

After nearly forty years of exponential growth, commonly called "Moore's law" growth, the performance levels of data processing systems have started to saturate due to excessive dissipated power. The close link between the recent progress in neuroscience and the manufacture of nanodevices suggests the possibility of designing and manufacturing radically new architectures with energy efficiency exceeding that of current systems by several orders of magnitude. These bioinspired or neuromorphic architectures use the operating principles of the brain that are currently known. They are composed of artificial neurons and synapses and they allow functions such as addressable memories, classifiers or function approximations to be completed.

It is even more important for neuron circuits to be designed with as few transistors and as low energy consumption as possible when these circuits are intended to be integrated in VLSI neural networks composed of several thousand neurons.

Software approaches for bioinspired architectures that are based on simulating the brain on a processor have been proposed, such as the "Synapse" chip by IBM.

Hardware approaches for bioinspired architectures also have been proposed, such as U.S. Pat. No. 6,242,988 B1 using positive feedback for the rapid generation of pulses, and patent application EP 2819068 A2 implementing an artificial neuron comprising a resistive memory.

Fairly complex circuits, such as that described in the article by N. Qiao et al, Frontiers in Neuroscience, volume 9, article 141, 2015, use CMOS technology to reproduce the behavior of the neurons, most often using the log-domain circuits' or 'current mirror' concept.

One biological membrane model among the most reputable models in the field of computational neuroscience is the Morris-Lecar model. This model has been deduced from measurements of the electrical activity of a muscle fiber of a giant barnacle and is described in an article published in the Biophysics Journal, volume 35, 1981. Even though it is based on a system of non-linear differential equations limited to only two variables (as opposed to other more complex models with four variables, such as the Hodgkin-Huxley model), the Morris-Lecar model closely adheres to biology and allows various pulse dynamics to be reproduced. The mathematical description of this model is inspired from experimental observations of the ionic currents passing through the membrane of the muscle fiber.

Several known circuits exist that reproduce the electrical properties of the Morris-Lecar cellular membrane model, such as that which is described in the article by R. Behdad et al., published in IEEE transactions on neural networks and learning systems, volume 26, 2015. In this article, the ionic currents represented in the Morris-Lecar model are those of calcium and potassium, and the ohmic losses through the membrane are also modeled.

In order to model a neuron, in this model it is possible to replace the calcium with sodium. In this case, the various ionic channels open or close, which produces the electrical activity of the neuron. When an external excitation is applied, for example, that depolarizes the membrane of the neuron so as to bring it to a less negative potential, the rapid opening of the sodium (or calcium) channels produces a rapid increase in the membrane potential of the neuron, whereas opening the potassium channels, more slowly, repolarizes the membrane of the neuron toward the negative open-circuit voltage. This activation/deactivation mechanism of the neuron produces pulses, also called spikes.

The circuit that is the subject of the article by R. Behdad is divided into several parts corresponding to the various ionic currents, where each part comprises discrete and active components, particularly transconductance operational amplifiers, which makes the circuit more complex.

The IEEE article by Chicca et al., published in 2014, entitled "Neuromorphic electronic circuits for building autonomous cognitive systems", discloses architectures for low-power circuits emulating neural and synaptic properties.

The ACM article by Zhao et al., published in the Journal on Emerging Technologies in Computing Systems in 2015, entitled "Spike-time-dependent encoding for neuromorphic processors", describes a neuron circuit in which the pulses are used to encode data.

The article by Van Schaik published in the Neural Networks review in 2001, entitled "Building blocks for electronic spiking neural networks", introduces an electronic circuit modeling the method for generating pulses in the biological neuron. As the circuit has a low surface area, several neural circuits can be implemented on a single chip.

Currently, known devices or circuits do not exist that address the following constraints in an entirely satisfactory manner:
- being very simple to implement resulting in a low surface area for very large-scale integration;
- having a wide adjustment range for the speed-power performance levels (several parameters allowing the speed-dissipated energy combination to be defined as a function of the application);
- using existing CMOS industrial technology;
- operating at very low voltage (power supply voltage not exceeding +/−100 mV) for very low consumption;
- having voltages compatible with direct interfacing with the living entity;
- being able to exhibit energy efficiency with a value below 1 fF pulse, that is several orders of magnitude below the energy efficiency value of a biological neuron;
- being able to be stable or oscillating without excitation current;
- being able to reproduce the generation of pulses, their non-attenuated propagation and the interconnections between neurons by means of synapses;
- being able to operate at a higher frequency than in the living entity in order to reduce the number of devices for the same computation power;
- being able to faithfully reproduce the wave form in terms of timescale and the amplitude of the spike of the biological neurons; and
- being able to reproduce the typical evolution of the response of the frequency of the spike of a biological neuron as a function of the value of the excitation current.

BRIEF SUMMARY OF THE INVENTION

The aim of the invention is to propose an artificial neuron able to address all or some of these constraints, and this aim is achieved, according to one of its aspects, by virtue of an artificial neuron comprising:
  a capacitor, called membrane capacitor;
  a negative feedback pulse circuit comprising:
    a bridge based on PMOS and NMOS transistors in series and connected by a midpoint to the membrane capacitor;
    at least one capacitor, called delay capacitor, between the gate and the source of one of the transistors of the bridge, so as to generate a conduction/blocking time lag between the transistors of said bridge; and
    at least two CMOS inverters between the membrane capacitor and the gates of the transistors of said bridge, so as to cause the transistors of the bridge to change state as a function of the voltage of the membrane capacitor and to allow the pulse circuit to generate at least one pulse when the voltage of the membrane capacitor crosses a predefined threshold, with charging of the membrane capacitor by one of the transistors of the bridge and discharging by the other transistor, the shape of the pulse being associated with said time lag.

The invention allows, if desired, a reduced number of transistors to be used, thus limiting the surface area occupied by the circuit. An example of a complete circuit produced using 65 nm TSMC technology according to the invention occupies a surface area of no more than 10 $\mu m^2$, whereas the soma of a biological neuron can be equivalent to a sphere with a diameter of 1 to 50 µm depending on the type of neuron, the axon may be millimeters, even centimeters, long.

The invention allows transistors to be used that are able to operate below the standard CMOS technology threshold and allows the use of at least one inverter, the transistors of which operate below the threshold as a voltage gain stage. The operation of the transistors below the threshold corresponds to the existence of a drain-source current that exponentially varies with the gate control voltage in the weak-inversion region or sub-threshold region of the transistor, where the gate-source voltage is below the threshold voltage at which the inversion zone appears (creation of a conduction channel between the drain and the source).

The invention also allows low capacitances to be used for the membrane capacitor in particular, with a value below 30 fF, particularly below 10 fF, preferably lying between 2 fF and 5 fF, whereas biological membrane capacitors have capacitances of approximately one or several hundred pF.

The invention allows circuits to be produced with the advantage of dissipating low energy per generated pulse, particularly with a value below 3.5 fJ/pulse, preferably lying between 1.1 fF pulse and 3.2 fF pulse, optimally below 0.5 fJ/pulse, whereas in biology the energy per generated pulse generally lies between 1 and 100 pJ. The energy dissipated by the artificial neuron according to the invention may be reduced, during actual operation, by 1 to 2 orders of magnitude compared to the existing artificial neuron circuits.

By virtue of the invention, it is possible to achieve relatively fast operation of the neural circuit, for example, at a frequency of approximately 100 kHz or more, whereas the frequency of the living entity does not exceed several tens of Hz.

Preferably, the artificial neuron comprises an input, called external synaptic excitation current, with the membrane capacitor integrating this input current. The midpoint connecting the transistors of the bridge forms the output of the artificial neuron.

The artificial neuron may comprise a leak resistor mounted parallel to the membrane capacitor, increasing the charging/discharging time thereof, by analogy with the membrane leak currents in the biological neuron. This leak resistor may be composed of a resistor or a transistor operating as a dipole.

According to an advantageous embodiment, the charging of the membrane capacitor is provided by the PMOS transistor of the bridge and the discharging thereof is provided by the NMOS transistor. In this case, the delay capacitance connected to the PMOS transistor is lower than the delay capacitance connected to the NMOS transistor, with the optimum being zero. The delay capacitance connected to the NMOS transistor is preferably greater than the membrane capacitance. This embodiment is similar to the biological operation of the neuron where the sodium/calcium channels (by analogy represented by the PMOS transistor of the bridge) are faster than the potassium channels (by analogy represented by the NMOS transistor of the bridge).

The delay capacitance can be provided either by a physical component that is connected between the gate of the associated transistor and a corresponding terminal of the power supply voltage, or by the sole parasitic capacitance that exists between the gate and the source of said transistor.

According to an advantageous embodiment, the artificial neuron comprises two CMOS inverters connected in a cascade like manner, the input of the first inverter being connected to the membrane capacitor and the output of said inverter being connected to the input of the second inverter and to the gate of one of the transistors, the output of the second inverter being connected to the gate of the other transistor.

The role of these inverters, each of which may be composed of two transistors, is to shape and amplify the voltage of the signals used to control the transistors of the bridge. This can be referred to as positive feedback.

By way of a variation, the artificial neuron comprises two CMOS inverters connected in a cascade like manner, the input of the first inverter being connected to the membrane capacitor and the output of said inverter being connected to the input of the second inverter, the output of the second inverter being connected to the gate of one of the transistors of said bridge, and comprises a third CMOS inverter, the input of which is connected to the membrane capacitor and the output of which is connected to the gate of the other transistor of said bridge.

The addition of the third inverter allows the controls of the transistors of the bridge to be independently optimized, by independently adjusting the threshold voltages of the inverters.

Adjusting the voltage gain and the threshold voltages of the inverters affects the operation of the artificial neuron.

Preferably, the threshold voltage of the neuron that produces the spike is the threshold voltage of the inverter supplying the PMOS transistor of the bridge. The number of inverters used can be defined as a function of speed or power consumption targets.

Preferably, the threshold voltage of at least one of the CMOS inverters is different from 0 V, particularly lying between −50 mV and +50 mV.

According to an advantageous feature of the invention, the artificial neuron operates in stable mode and the PMOS and NMOS transistors of said bridge have different conductance values, preferably at a ratio of at least 2, particularly from 2 to 7, for example, from 5 to 7. By analogy, the stable mode corresponds to that of the operation of the neurons of the brain. In stable mode, in order to be able to generate pulses, the neuron must receive a non-zero external excitation current, the value of which depends on the degree of stability. Indeed, the higher the ratio of the conductances of the transistors of the bridge, the greater the stability, the greater the minimum intensity of the excitation current required to disrupt the stability.

According to another advantageous feature of the invention, the artificial neuron operates in relaxation oscillator mode and the PMOS and NMOS transistors of said bridge may have relatively close conductance values, preferably at a ratio of 0.5 to 3, optimally from 0.8 to 1.2, more optimally of approximately 1.

The relaxation oscillator mode by analogy corresponds to that of the operation of certain neurons of the spinal cord or of cardiac cells. In relaxation oscillator mode, the neuron is unstable and generates pulses without an external excitation current. In such a case, the external synaptic excitation input is not necessary.

According to the invention, the pulse circuit is supplied by a power supply where Vd>Vs. The difference (Vd−Vs) preferably is established so that each inverter exhibits a voltage gain that is greater than or equal to 2, particularly with a power supply such that (Vd−Vs)>=100 mV, preferably (Vd−Vs)>=120 mV. Preferably, (Vd−Vs)<Vth, with Vth being the threshold voltage of all the MOS transistors of the artificial neuron. This relationship between the voltages allows all the transistors of the neuron to operate below the threshold, for any operating mode thereof (stable or relaxation oscillator) and for any drain-source voltage of the transistors, i.e. whether or not said transistors are in saturation mode (Vds>Vth). In general, the voltage Vs is negative and lies between −200 mV and 0 mV, and the voltage Vd is positive and lies between 0 mV and +200 mV; for low-energy operation, the negative voltage preferably lies between −100 mV and −50 mV and the positive voltage lies between +50 and +100 mV; the negative voltage particularly lies between −100 mV and −70 mV and the positive voltage lies between +70 and +100 mV for applications compatible with biology. The amplitude of the spikes preferably lies between 40 mV and 200 mV. Preferably, |Vd−Vs|<=400 mV.

The invention is not limited to particular technology for producing the neuron. According to an advantageous embodiment, the transistors of said bridge are produced using FD-SOI technology using the possibility of control by the substrate, called backgating. The maximum current of the transistors is then controlled by a voltage, called backgate voltage, applied to a substrate electrode. This backgate voltage, by modifying the maximum current values of the transistors of the bridge, allows the frequency of the spikes and the average dissipated power to be modified, with the energy efficiency (energy dissipated per pulse) not being substantially modified.

The artificial neuron may operate in a burst mode, emitting bursts of pulses at regular intervals by means of an excitation circuit integrating the membrane potential and reinjecting a current resulting from this integration into the membrane capacitor.

The burst mode also may be obtained without an external excitation current in the event that the neuron is unstable.

The burst mode of the artificial neuron is particularly interesting for deep brain stimulation, which is useful when treating neurological conditions such as Parkinson's disease.

The artificial neuron can operate by implementing a stochastic resonance. The phenomenon of stochastic resonance is a non-linear effect in which a random signal, particularly a noise, promotes the transmission of a useful signal. This effect can assume various forms, depending on the types considered for the noise, the useful signal, the non-linear transmission system and the performance measurement that is improved by adding noise.

In this case, the artificial neuron receives an external excitation made up of two different currents: a periodic current with insufficient amplitude for generating spikes and a random noise current.

The invention also relates to, according to another one of its aspects, a neural network comprising a plurality of artificial neurons according to the invention as defined above, where at least two artificial neurons, called pre-neuron and post-neuron, are connected together by a synaptic circuit.

Preferably, the synaptic circuit has two inputs and comprises two transistors connected in series by the drains thereof, at least one of said transistors being of the NMOS type controlled by a gate potential corresponding to the first input of the synaptic circuit, the gate of the second transistor corresponding to the second input of the synaptic circuit, the output of the synaptic circuit corresponding to the source of the NMOS transistor being connected to the output potential of the post-neuron.

There are two types of synapses: excitatory and inhibitory.

The excitatory synapses promote the creation of a spike by the post-neuron, depolarizing the membrane of the post-neuron and fulfill a role similar to that of sodium channels. Their action may be simulated by a PMOS transistor connected to the positive terminal of the power supply voltage.

The inhibitory synapses, which hinder the creation of a spike by the post-neuron, hyperpolarize the membrane of the post-neuron and fulfill a role similar to that of potassium channels. Their action may be simulated by an NMOS transistor connected to the negative terminal of the power supply voltage.

The synaptic circuit may correspond to an excitatory synapse, where the second input of the synaptic circuit is connected to the output of an inverter, having the membrane potential of the pre-neuron as input, particularly to the gate of the PMOS transistor of the bridge of the pre-neuron.

The synaptic circuit may also correspond to an inhibitory synapse, where the second input of the synaptic circuit may be connected to the output of two inverters in series, with the input of the first inverter being subject to the membrane potential of the pre-neuron.

The second input of the synaptic circuit, in the case of an inhibitory synapse, may be connected to the gate of the NMOS transistor of the bridge of the pre-neuron.

The invention also relates to, according to another one of its aspects, a data processing method, in which a neural network is used as previously described, for processing images, video or for facial recognition, by way of an example.

Preferably, an intrinsic thermal noise of the artificial neuron is used to keep information inside the neural network after learning.

According to an advantageous embodiment, multiple very high frequency spikes are applied to the input of an integrating circuit, the output of which is connected to the first input of an excitatory synapse as previously described.

Preferably, the integrating circuit comprises an NMOS transistor, the source of which, corresponding to the output of the integrating circuit, is connected to a capacitor, the gate and the drain of said transistor being connected together and corresponding to the input of the integrating circuit.

It is also possible for the artificial neuron to be operated in burst mode by coupling it to a second neuron oscillating at low frequency by means of two synapses, one of which is an excitatory synapse from the first neuron to the second neuron, and the other one of which is an inhibitory synapse from the second neuron to the first neuron.

Preferably, the membrane and delay capacitances of the second neuron are at least 100 times greater than those of the first neuron.

For example, the membrane and delay capacitance values of the second neuron are 0.1 pF and 1 pF, respectively, and those of the first neuron are 1 fF and 10 fF, respectively.

The invention also relates to, according to another one of its aspects, an artificial central pattern generator comprising at least two artificial neurons according to the invention and an inhibitory synapse as previously defined for generating or regenerating locomotor activity in the living entity or for robotics, by way of an example. The central pattern generator in the living entity is a neural network housed in the spinal cord.

According to one advantageous embodiment, the artificial central pattern generator comprises a pre-neuron operating in burst mode and a post-neuron operating in oscillating mode, associated by an inhibitory synapse.

According to another advantageous embodiment, the artificial central pattern generator comprises two artificial neurons both operating either in oscillating mode or in burst mode and mutually coupled by two inhibitory synapses, the synaptic weights of which may or may not be equal, so that each of the neurons is both a pre- and post-neuron. The synaptic weight is defined as being the ratio between the amplitude of the post-synaptic potential (EPSP for 'Excitatory Post Synaptic Potential' or IPSP for 'inhibitory Post Synaptic potential') and the amplitude of the pre-synaptic signal, i.e. the spike of the pre-neuron.

The term "capacitance" may denote both a capacitor as a component and its electric capacitance as a physical value, measured in Farads (F).

"Membrane potential" denotes the potential at the terminal of the membrane capacitor connected to the midpoint of the bridge of transistors.

BRIEF DESCRIPTION OF THE DRAWINGS

The invention will be able to be better understood upon reading the following description of non-limiting embodiments thereof, and with reference to the appended drawings, in which:

FIGS. 4a and 4b show the wave forms of the potentials and currents obtained by the simulation of the circuit of FIG. 3;

FIG. 4c shows the wave forms of the membrane potential and currents of the ionic channels obtained by simulating a biological neuron model;

DETAILED DESCRIPTION OF THE INVENTION

Figure 1:
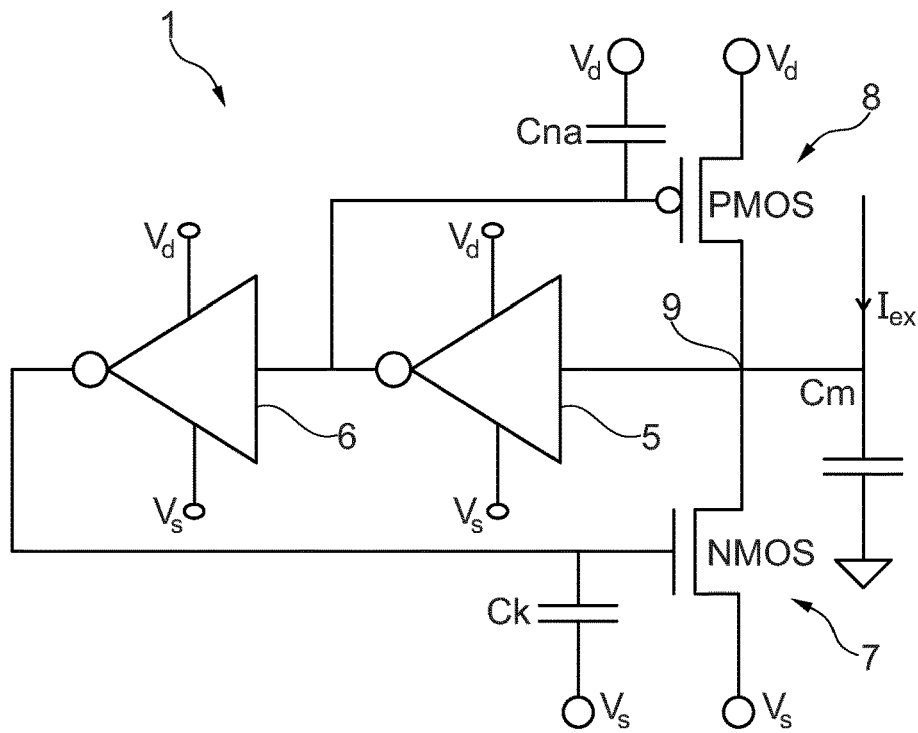
FIG. 1 schematically shows an artificial neuron according to a first embodiment of the invention.

FIG. 1 shows the diagram of an artificial neuron 1 according to a first embodiment of the invention, with two inverters 5 and 6 connected in a cascade like manner, the output of the first inverter being connected to the input of the second inverter. The output of the first inverter 5 is connected to the gate of a PMOS transistor 8. The output of the second inverter is connected to the gate of an NMOS transistor 7.

In FIG. 1, the transistors 7 and 8 are electrically connected in series and form a bridge between the power supply voltages Vs and Vd.

The midpoint 9, defining the connection of the drains of the transistors of the bridge, is connected to a terminal of a membrane capacitor Cm. The other terminal of the membrane capacitor Cm is connected to ground 0 V. Otherwise, by way of a variation, this terminal may be connected either to Vs or to Vd.

In this example, Vs=<0 and Vd>=0.

A capacitor Ck is connected between Vs and the gate of the NMOS transistor 7. The terminal of the capacitor Ck connected to Vs otherwise may be connected to ground.

A capacitor Cna is connected between Vd and the gate of the PMOS transistor 8. The terminal of the capacitor Cna connected to Vd otherwise may be connected to ground.

$I_{ex}$ denotes the external excitation current, for example, originating from the synapses (not shown in FIG. 1).

When the membrane potential Cm reaches the threshold voltage of the first inverter 5, a corresponding potential is then transmitted, after a first inversion by the inverter 5, to the gate of the PMOS transistor 8, activating said transistor after a delay that is defined by the capacitance Cna. Thus, the membrane capacitor Cm charges via the open conduction channel of the PMOS. This charge corresponds to the rising edge of the output spike.

When the threshold voltage of the second inverter 6 is reached, a corresponding potential is transmitted to the gate of the NMOS transistor 7, activating said transistor after a delay that is defined by the delay capacitance Ck, which delay is, in the example, considered to be longer than the delay for activating the PMOS, due to the selection of Ck>Cna. Thus, after having had time to charge, the membrane capacitor Cm begins to discharge when the conduction channel of the NMOS is opened. This discharge corresponds to the falling edge of the output spike.

The power supply voltages Vd and Vs in this case are the respective equivalents of the Nernst potentials of sodium and potassium by analogy with biology.

The PMOS 8 and NMOS 7 transistors of the bridge respectively represent the sodium and potassium channels.

The delay capacitances Cna and Ck represent the time constants required to open the sodium and potassium channels, respectively, as suggested by the aforementioned Morris-Lecar model.

In general, in accordance with biology, the channels K are slower than the channels Na, which leads to Ck>Cna. Furthermore, in the considered example, the conductance of the NMOS transistor 7 of the bridge is greater than that of the PMOS transistor 8, which induces a membrane resting potential that is close to Vs, when the excitation current $I_{ex}$ is zero.

Figure 2:
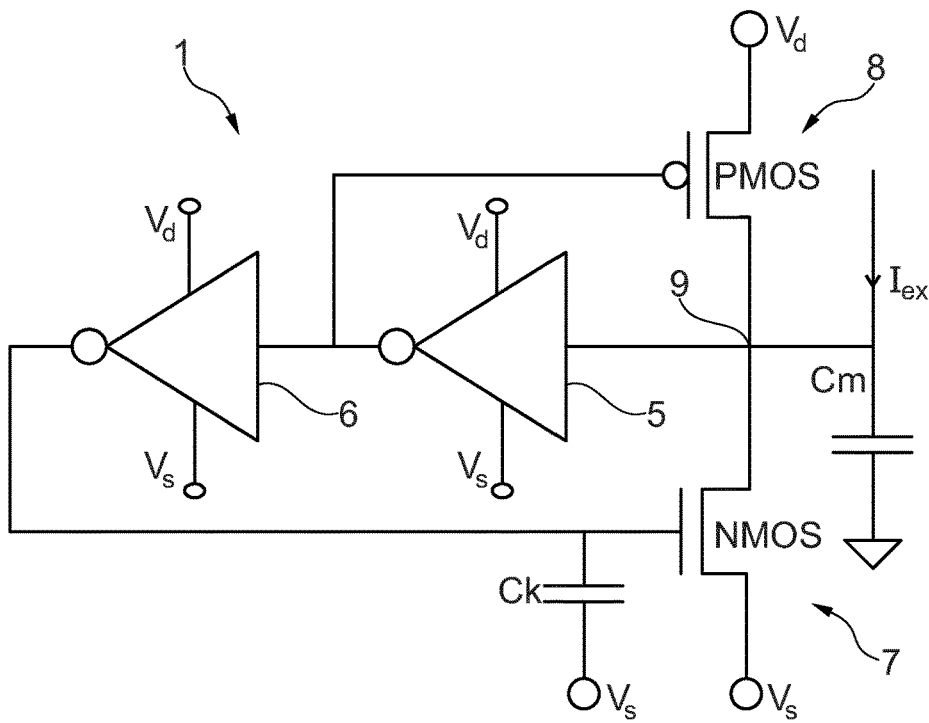
FIG. 2 is a similar view to that of FIG. 1 of an artificial neuron according to a second embodiment of the invention.

The capacitance Cna can be equal to 0, as shown in FIG. 2.

Figure 3:
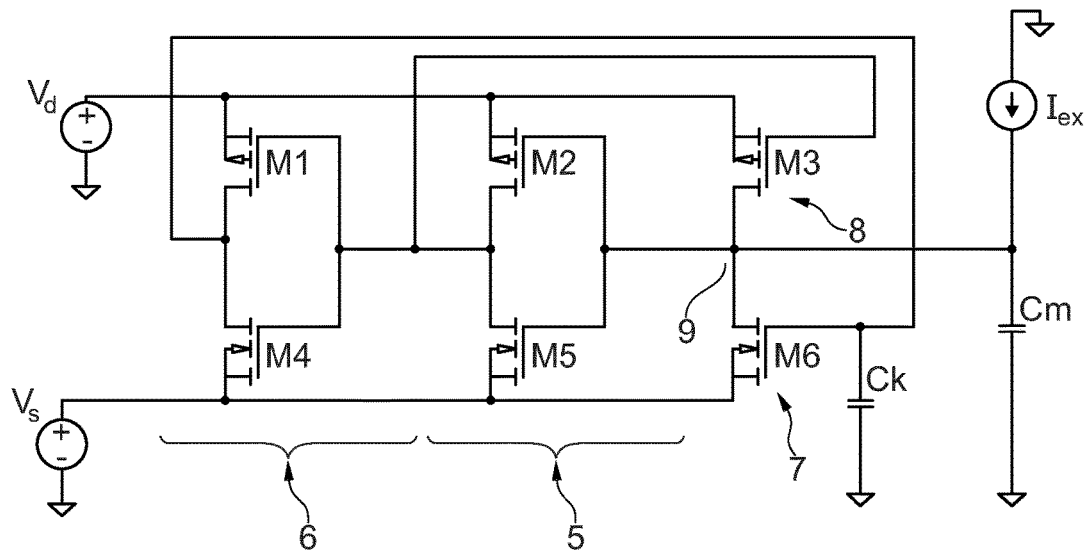
FIG. 3 shows a digital simulation circuit according to the second embodiment.

FIG. 3 shows a digital simulation circuit produced with the Spice analogue circuit simulator according to the example of FIG. 2.

The transistors 8 and 7 of the bridge respectively correspond to the transistors denoted M3 and M6 in FIG. 3, with a gate width that is equal to 0.6 μm.

The inverter 5 is composed of two transistors M2 and M5, the gate widths of which are equal to 0.3 μm.

The inverter 6 is composed of two transistors M1 and M4, the gate width of which is equal to 0.3 μm and 0.05 μm, respectively.

The gate length of the transistors is 22 nm. The negative power supply voltage is −100 mV and the positive power supply voltage is +100 mV.

The capacitances Ck and Cm equal 50 fF and 10 fF, respectively.

The external excitation current is constant, equal to 30 pA.

Figure 4A:
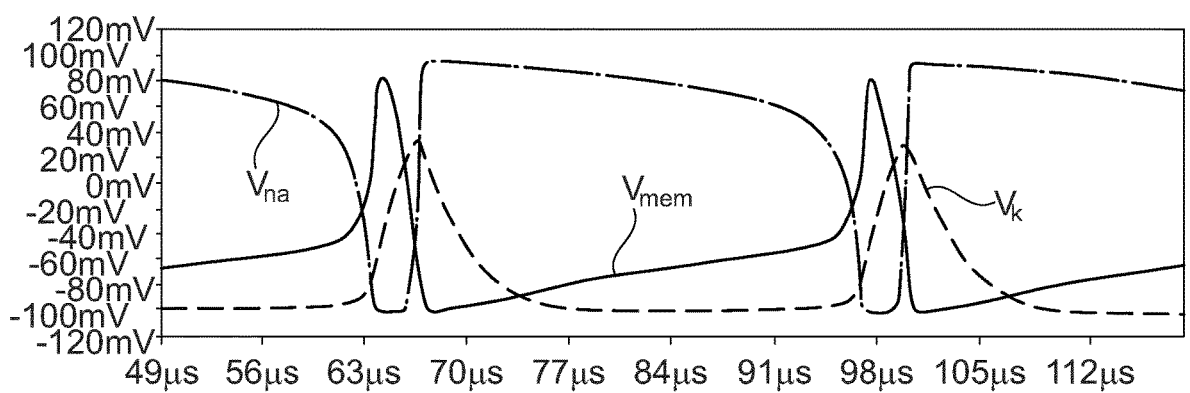

FIG. 4a shows the wave forms of the membrane potentials $V_{mem}$ and the voltages $V_{na}$ of the gate of the PMOS transistor 8 and $V_k$ of the gate of the NMOS transistor 7.

FIG. 4b shows, in addition to the membrane potential $V_{mem}$, the wave forms of the currents Id(M3) of the drain of the transistor 8 and Is(M6) of the drain of the transistor 7 of the circuit of FIG. 3.

These wave forms of the membrane potential and of ionic currents are similar to those encountered in the living entity, as shown in FIG. 4c, which shows the wave forms obtained by a simulation on a Matlab® digital computation tool of the Wei biological neuron model (Y. Wei et al., The Journal of Neuroscience, Aug. 27, 2014), where Ina and Ik represent the curves of the sodium and potassium currents, respectively.

A qualitative match of the wave forms between FIGS. 4b and 4c may be seen.

In a variation where Ck<Cna and where the PMOS transistor of the bridge is more conducting than the NMOS transistor, the resting potential of the membrane is close to Vd and the outputs of the two inverters shown in FIG. 1 are modified so that the output of the first inverter is connected to the gate of the NMOS transistor and the output of the second inverter is connected to the gate of the PMOS transistor.

Figure 5:
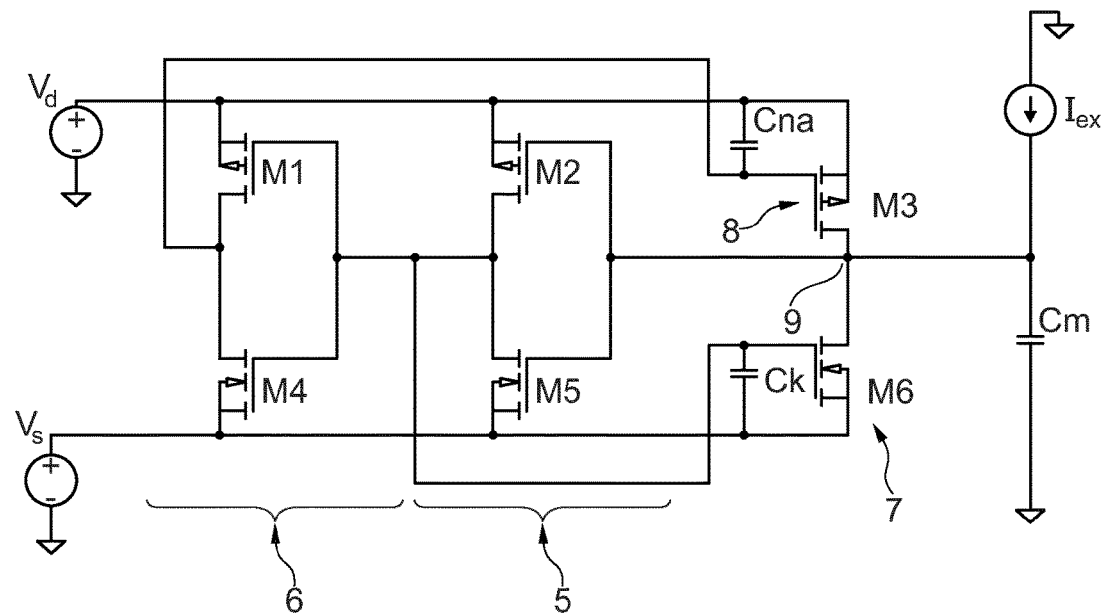
FIG. 5 shows a digital simulation circuit according to a third embodiment of the invention.

A Spice digital simulation circuit according to this third embodiment of the invention is shown in FIG. 5.

Figure 6:
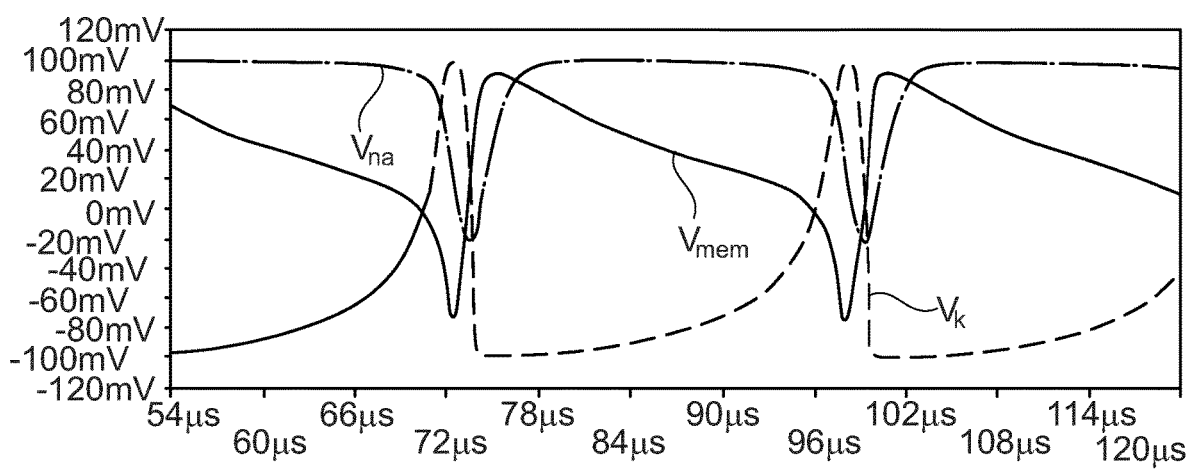
FIG. 6 shows the wave forms of the potentials obtained by the digital simulation of the circuit of FIG. 5.

FIG. 6 shows the wave forms that are obtained, and it can be seen that the pulses are reversed relative to those of FIG. 4a.

Figure 7:
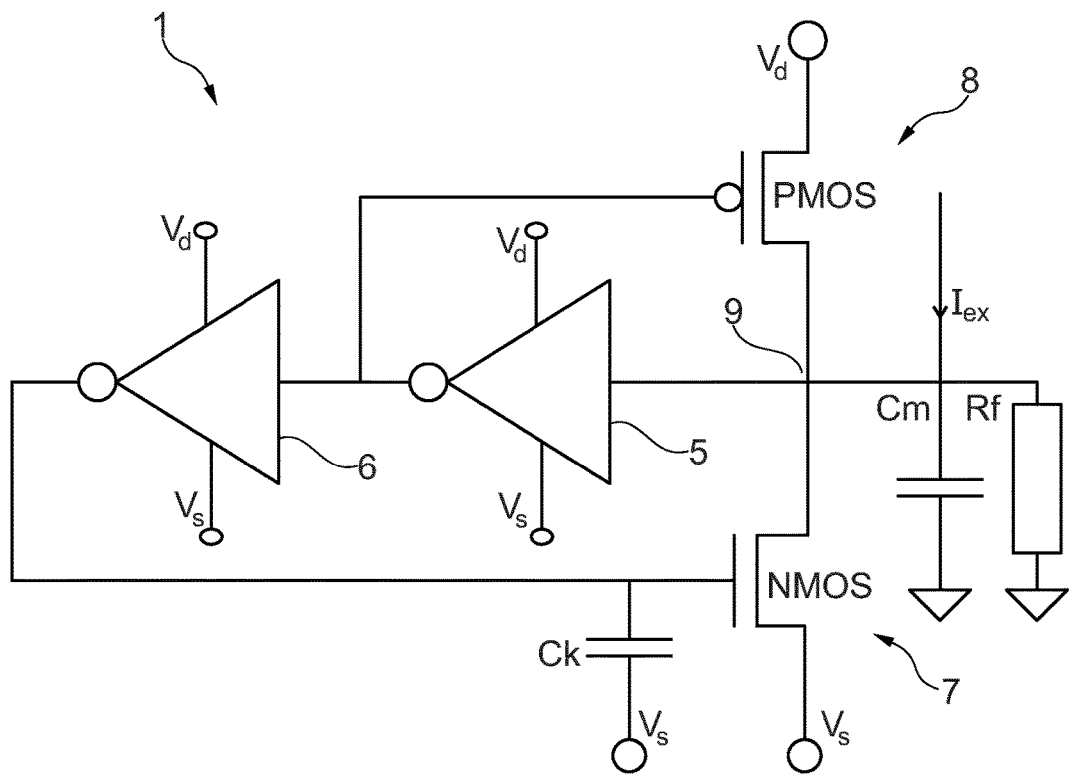
FIG. 7 schematically shows an artificial neuron according to a fourth embodiment of the invention.

FIG. 7 schematically shows a neural circuit according to another embodiment of the invention, which differs from that of FIG. 2 through the presence of a leak resistor $R_f$ parallel to the membrane capacitor Cm, by analogy with the leaks through the biological membrane. It is also possible to eliminate this leak resistor through a suitable design of the transistors of the bridge, so as to make the NMOS transistor much more conducting than the PMOS transistor.

The Spice digital simulation in this example has been completed using the STM 28 nm FD-SOI components library.

The power supply voltages Vs=−60 mV and Vd=60 mV in this example allow a peak-to-peak amplitude of 100 mV to be obtained. It is possible to obtain pulses at lower power supply voltages, but the peak-to-peak amplitude of 100 mV is then no longer reached.

If the gate widths of the transistors of the bridge are equal, the PMOS transistor has a lower drain current than that of the NMOS transistor. Hence, the gate width of the PMOS transistor preferably is adjusted so as to balance these current values, with the gate width of the NMOS transistor being equal to 80 nm and that of the PMOS transistor being equal to 450 nm, for example.

Figure 8A:
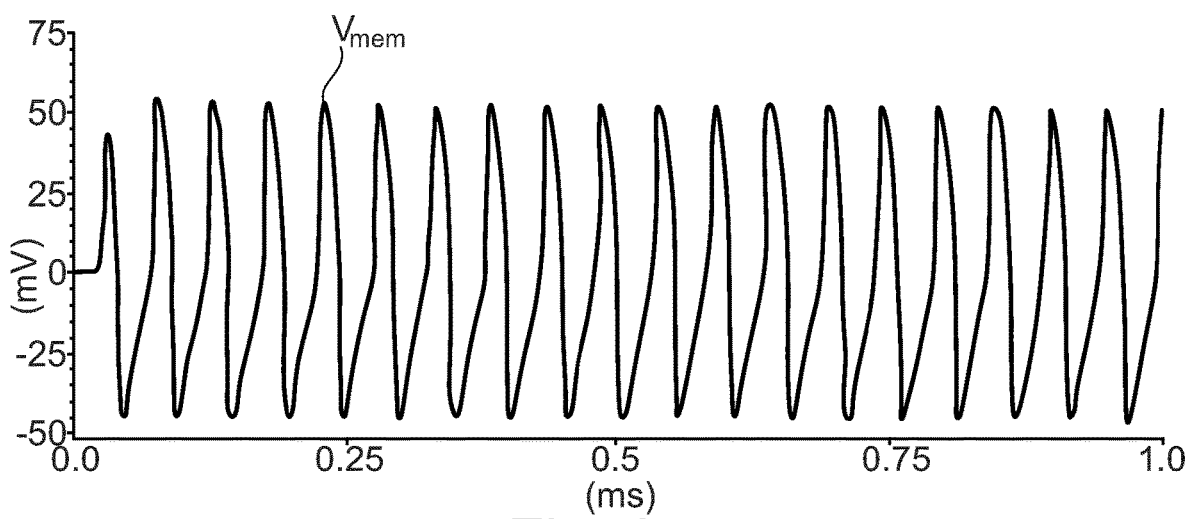
FIGS. 8a to 8g show the results obtained by the simulation of a circuit according to FIG. 7.

FIG. 8a shows the wave form of the membrane potential in the event that Ck=50 fF and Cm=5 if. 20 peak-to-peak 100 mV amplitude pulses can be seen over a period of 1 ms.

Figure 8B:
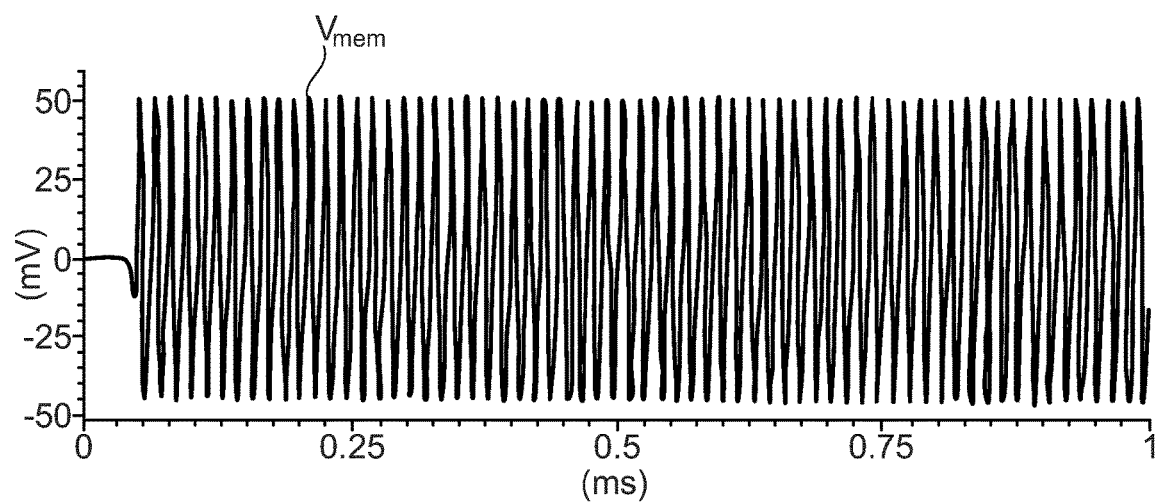

FIG. 8b shows the wave form of the membrane potential in the event that Ck=10 fF and Cm=1 fF. An increase in the frequency of the pulses can be seen for the same simulation duration.

Figure 8C:
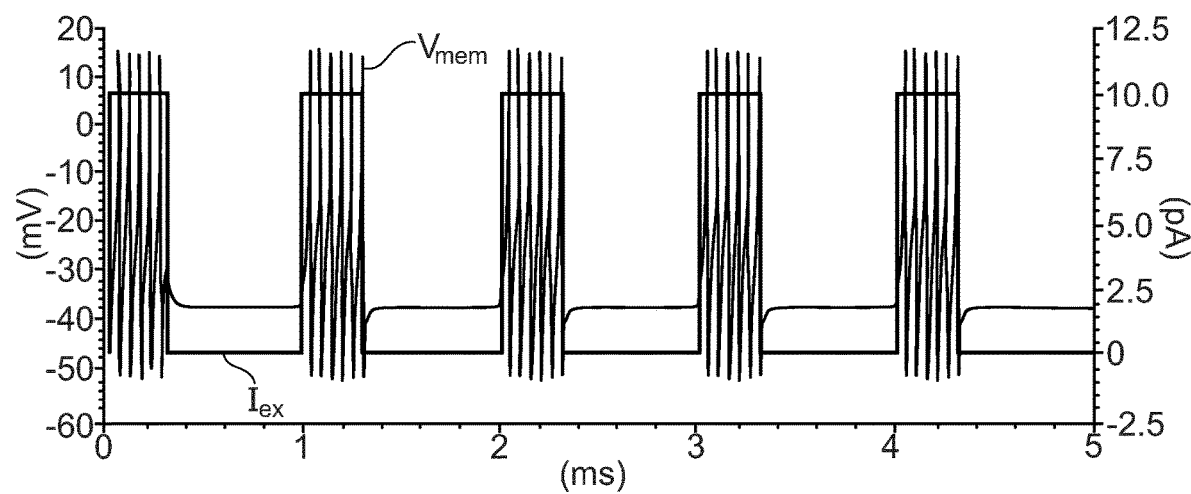

FIG. 8c shows the excitation current $I_{ex}$ as slots and shows the membrane potential $V_{mem}$. It can be seen that the neuron reacts to the excitation.

Figure 8D:
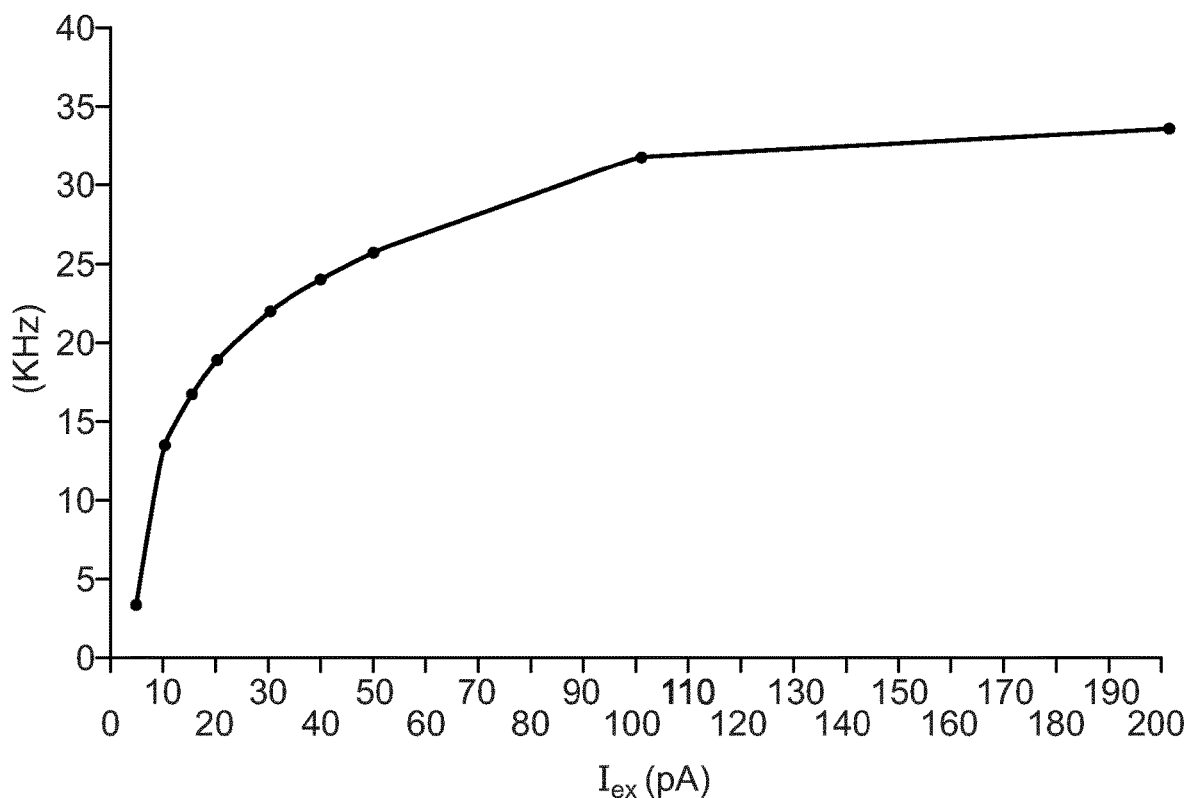

FIG. 8d shows the variation curve of the frequency of the pulses as a function of the amplitude of the excitation current $I_{ex}$.

These results demonstrate that the excitation current $I_{ex}$ and the values of the capacitances Ck and Cm influence the frequency of the pulses, which demonstrates the flexibility of the neural circuit in the sense that these various parameters may be used to optimize output pulses.

Figure 8E:
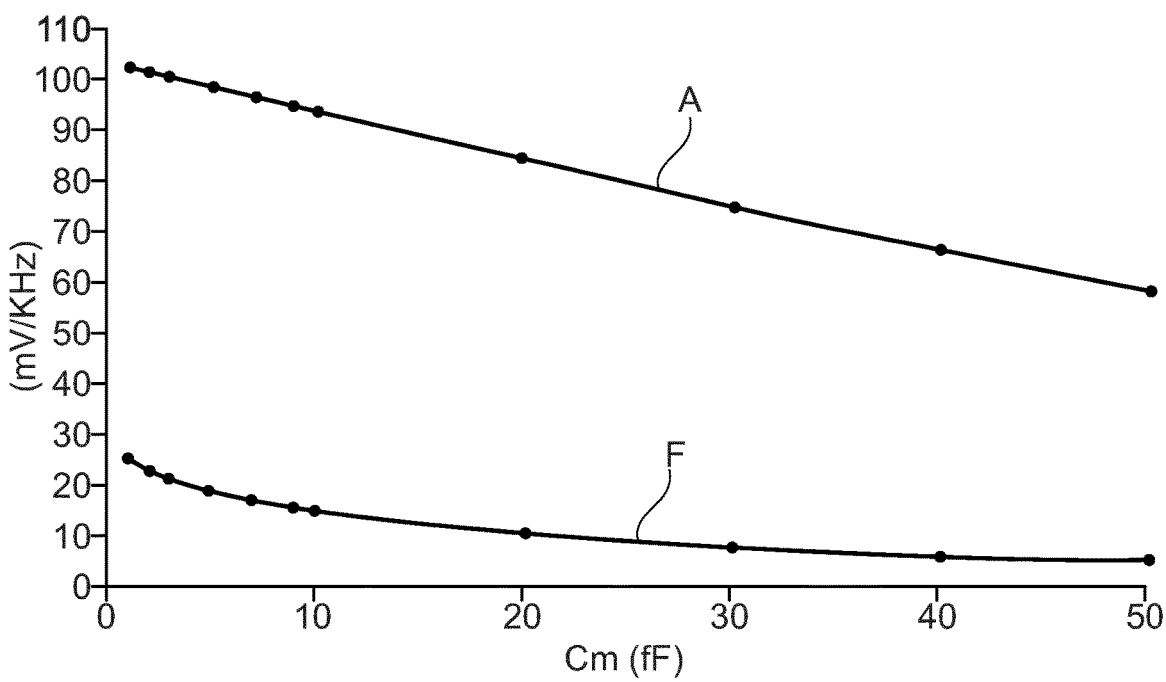
Figure 8F:
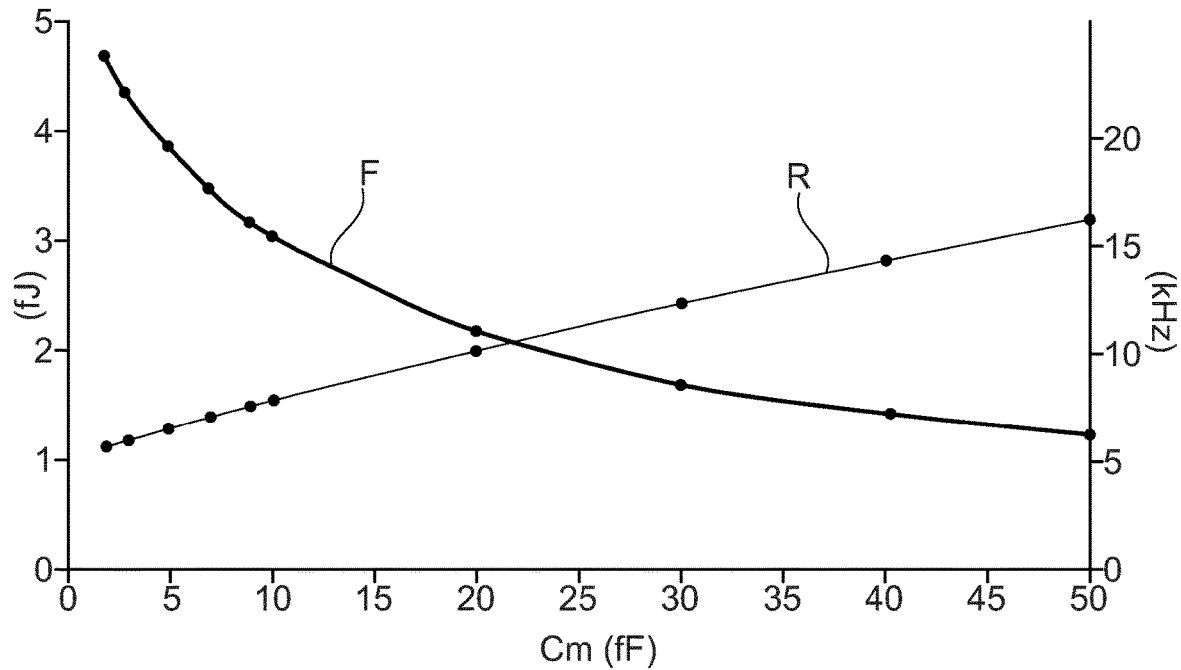

In FIGS. 8e and 8f, the value of Ck is set to 50 fF and Cm is varied from 2 fF to 50 fF.

FIG. 8e shows the variation curve A of the peak-to-peak amplitude of the membrane potential, as well as the variation curve F of the frequency of the pulses as a function of the capacitance Cm. A reduction in the amplitude and the frequency of the pulses is observed with the increase in the value of the capacitance Cm.

FIG. 8f shows, in addition to the variation curve F of the frequency of the pulses, the evolution curve R of the energy efficiency per pulse.

It can be seen that the energy consumed per pulse hardly changes (from 1.1 to 3.2 fJ/pulse), in a quasi-linear manner, in the variation range [2 fF, 50 fF] of Cm.

Figure 8G:
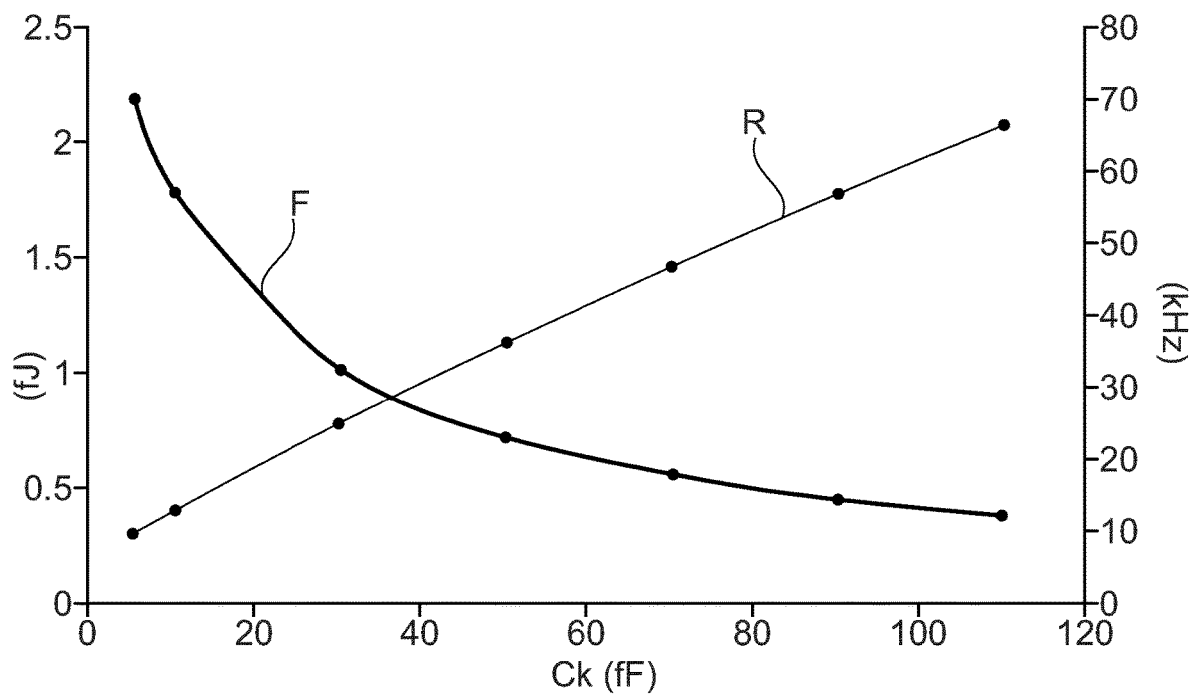

FIG. 8g shows the variation of the frequency of the pulses (curve F) and the energy efficiency per pulse (curve R) as a function of the capacitance Ck, with the capacitance Cm being set to 2 fF.

The curves of FIGS. 8f and 8g have the same appearance. FIG. 8g also shows that the frequency of the pulses increases at low capacitance Ck values, and that the energy efficiency seems to be directly proportional to Ck, with the value of Cm being constant.

It can be seen that it is possible to obtain very low energy efficiency values, which may equal 0.3 fJ per pulse for Ck=5 fF and Cm=2 fF.

Figure 9:
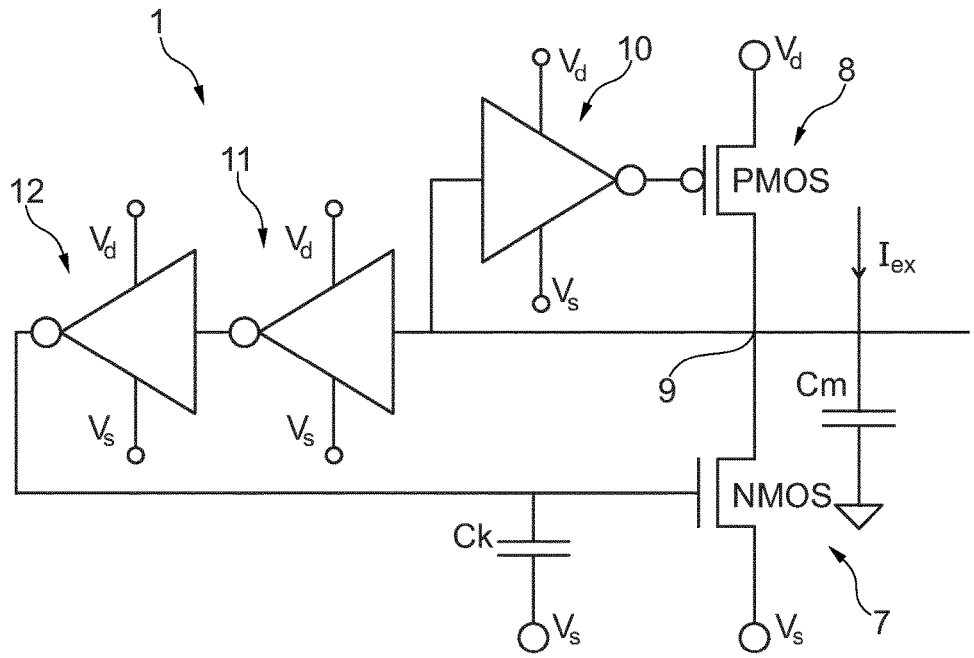
FIG. 9 schematically shows an artificial neuron according to a fifth embodiment of the invention.

FIG. 9 schematically shows a neuron according to another embodiment of the invention, which differs from that of FIG. 2 through the addition of a third inverter 12, the first inverter 10 transmitting the output potential, after inversion, to the gate of the PMOS transistor 8 of the bridge, and the other two inverters 11 and 12, connected in a cascade like manner, transmitting the output potential to the gate of the NMOS transistor 7.

The inputs of the inverters 10 and 11 are connected to the midpoint 9 of the bridge and to the membrane capacitor, and the input of the inverter 12 is connected to the output of the inverter 11.

With some approximations, the output voltage $V_{out}$ of an inverter below the threshold, supplied in a symmetrical manner (Vs=-Vd), is provided by:

$$V_{out} = -Vd \tanh[V_{in}/(nV_t) + 0.5 \ln(I_{n0}/I_{p0})].$$

Where $V_{in}$ is the input voltage of the inverter, $I_{n0}/I_{p0}$ is the ratio of the maximum currents of the NMOS and PMOS transistors, $V_t$ is the thermal potential $k_B T/q$ (with $k_B$ being the Boltzmann constant, T the temperature and q the charge of an electron) and n is the ideality coefficient, being greater than 1.

The expression of $V_{out}$ shows that the maximum voltage gain of the inverter is $-Vd/(nV_t)$ and that the threshold voltage is provided by $(-nV_t/2) \ln(I_{n0}/I_{p0})$.

Therefore, the voltage gain that is provided by the inverters with the power supply voltage may be adjusted, and the threshold voltage may be modified by several $nV_t$ by adjusting maximum currents of the NMOS and PMOS transistors (by modifying the gate width W of the transistors, for example).

Figure 10:
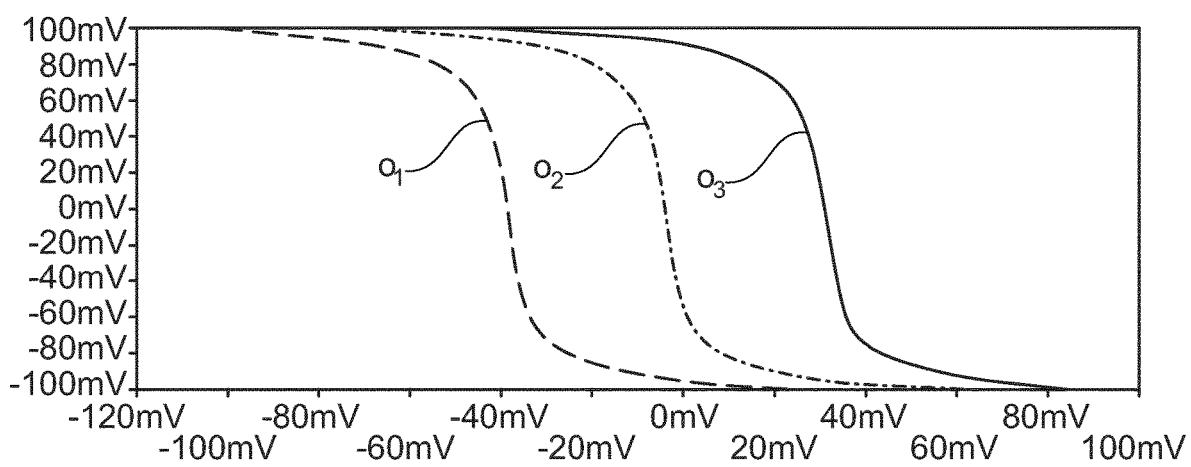
FIG. 10 shows the input-output characteristic of an inverter below the threshold as a function of the ratio of the maximum drain currents of its transistors N and P.

FIG. 10 shows the input-output characteristic of an inverter below the threshold as a function of three different values of the ratio of the maximum currents of the NMOS and PMOS transistors: $(I_{n0}/I_{p0})$=6 (curve $o_1$), $(I_{n0}/I_{p0})$=1 (curve $o_2$) and $(I_{n0}/I_{p0})$=1/6 (curve $o_3$).

The transistors 7 and 8 of the bridge may be produced using FD-SOI technology using the possibility of control by a substrate electrode. In this case, the maximum current of the transistors is not only controlled by their gate width W, but also by the substrate electrode. Hence, an action on the substrate voltage $V_{BB}$ allows the temporal (charging time of the capacitors) and energy properties of the circuit to be modified.

Figure 11A:
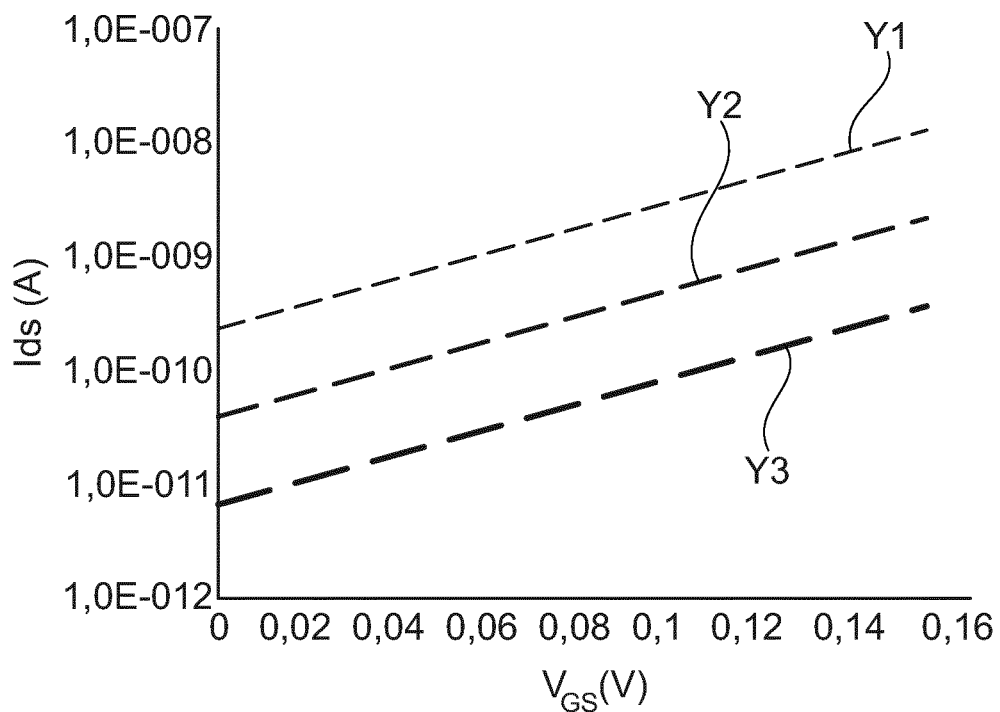
FIGS. 11a and 11b show the results obtained by the digital simulation of a neuron circuit according to the invention, using the possibility of control by the substrate.
Figure 11B:
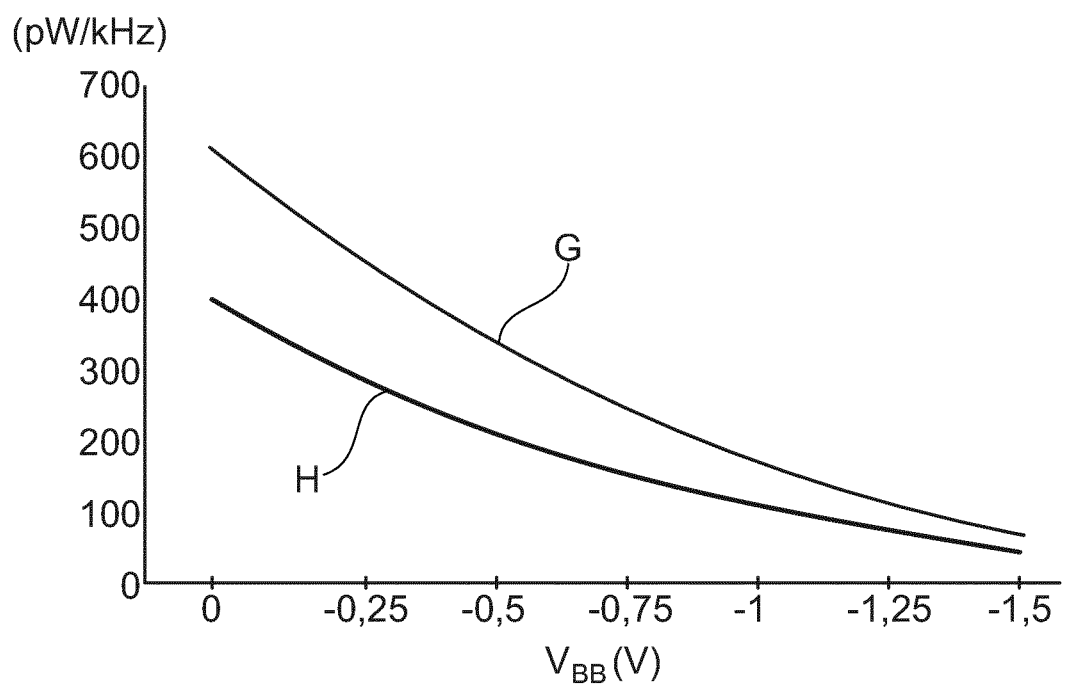

FIGS. 11a and 11b show, for the 28 nm FD-SOI technology, the influence of the substrate voltage on the maximum current of the transistor below the threshold and on the frequency of the pulses and the dissipated power.

FIG. 11a shows the variation of the maximum current of an NMOS transistor below the threshold for various substrate voltage values: $V_{BB}$=0 (curve Y1), $V_{BB}$=-1 V (curve Y2) and $V_{BB}$=-2V (curve Y3). These variations are provided for a gate width W=1.2 μm and a drain-source voltage $V_{ds}$=0.1 V.

FIG. 11b shows the impact of the substrate voltage on the frequency of the pulses in kHz at a constant external excitation current (curve G), and on the total dissipated power in pW (curve H).

Figure 11C:
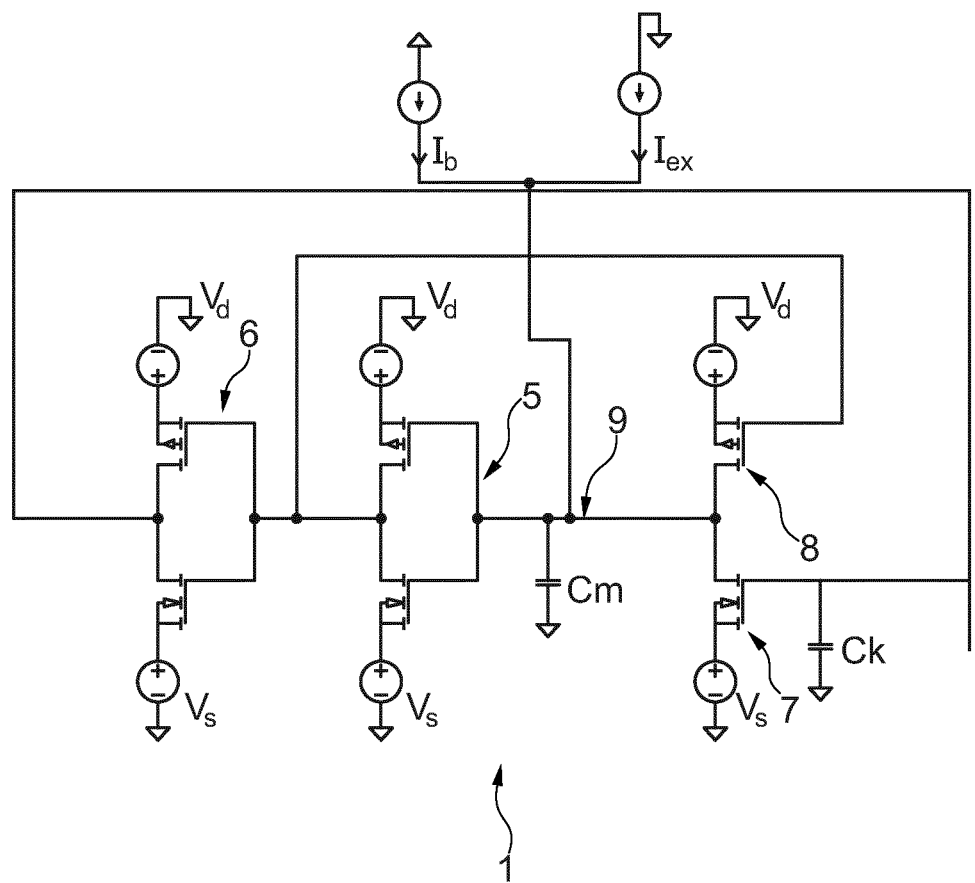
FIG. 11c shows a digital simulation circuit of an artificial neuron highlighting the phenomenon of stochastic resonance.

FIG. 11c shows a digital simulation circuit of an artificial neuron exhibiting the phenomenon of stochastic resonance. The neuron 1 is excited by two different current sources: a periodic current $I_{ex}$, sinusoidal in this case, with insufficient amplitude for generating spikes, and a random noise current $I_b$.

Figure 11D:
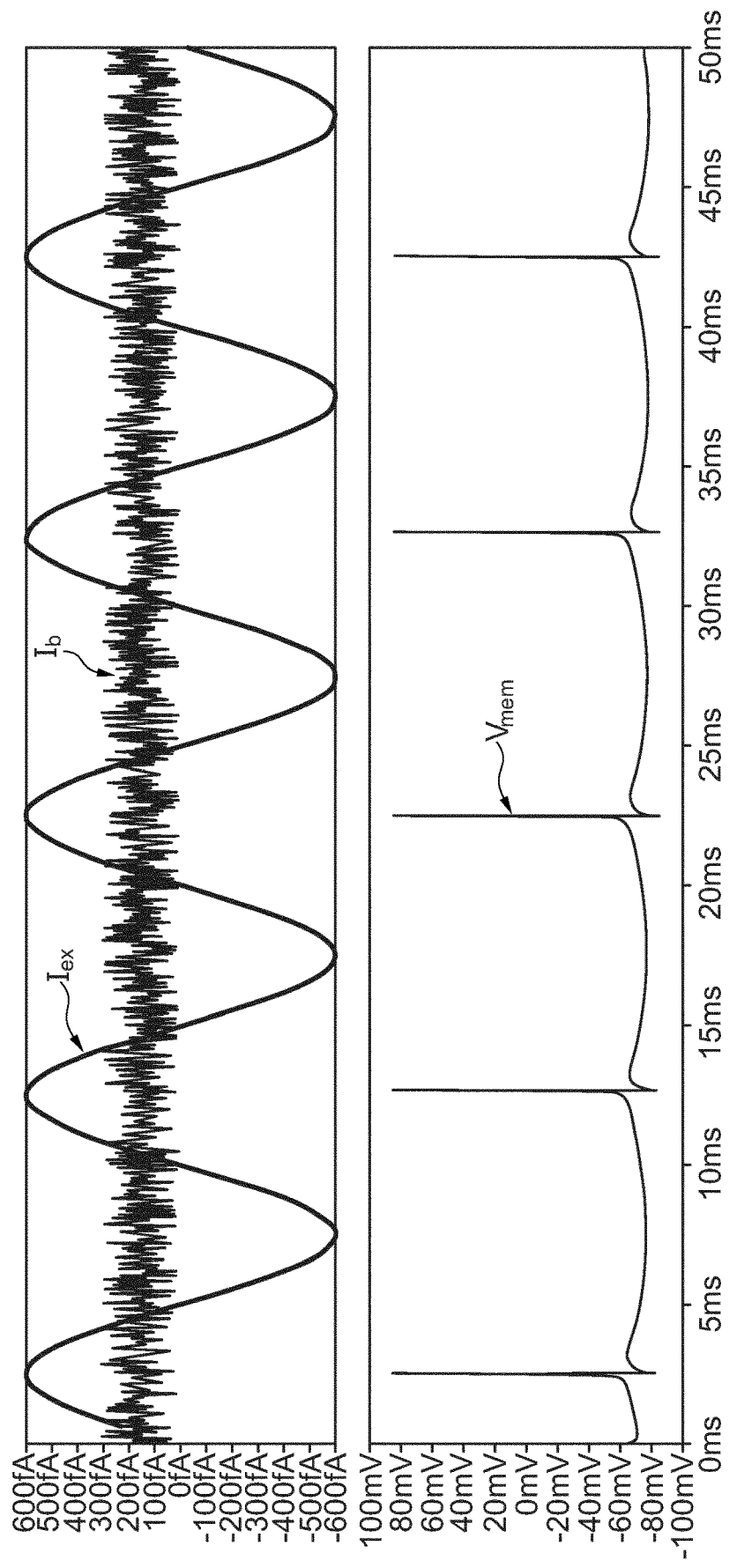
FIG. 11d shows wave forms of the excitation currents and the membrane potential in the case of stochastic resonance.

FIG. 11d shows the wave forms of the two excitation currents and of the membrane potential $V_{mem}$. When the periodic excitation current passes through a maximum, the added noise is sufficient to generate a spike: this is the phenomenon of stochastic resonance.

Figure 20:
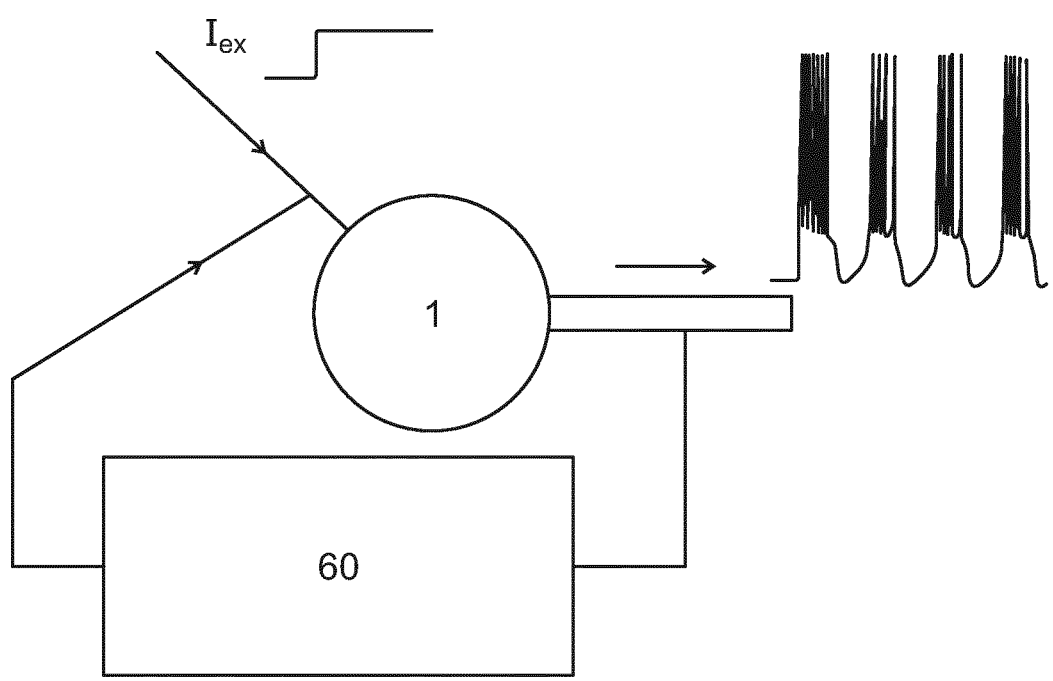
FIG. 20 schematically shows an artificial neuron operating in burst mode by means of an additional excitation circuit.

FIG. 20 shows an artificial neuron operating in burst mode, where an additional excitation circuit 60 is used to integrate the membrane potential and to inject an excitation current into the membrane capacitor that results from this integration, thus continually alternating between an ultrafast pulsed operation and a refractory operation.

In order to obtain burst mode operation of an artificial neuron according to the Morris-Lecar model, one possibility is that the relationship between the excitation current $I_{ex}$ and the membrane potential $V_{mem}$ is governed by an equation of the following type:

$$dI_{ex}/dt = \varepsilon(V_0 - V_{mem}(t-T)),$$

where $\varepsilon$, $V_0$ and T are constants to be defined according to the desired properties.

This equation is the equation of an inductive circuit, where the excitation current is proportional to the whole of the membrane potential.

Indeed, when the resting membrane potential is close to Vs, the derivative $dI_{ex}/dt$ of the excitation current is positive. The excitation current increases and $V_{mem}$ reaches the oscillation threshold. The oscillations increase the average value of the membrane potential, resulting in a negative current derivative $dI_{ex}/dt$ and a reduction in the excitation current, which then drops below a threshold, stopping the burst.

The principle of the burst mode operation therefore involves increasing, and respectively decreasing, the excitation current when the membrane potential is below, and respectively above, a certain threshold.

As a function of the constants $\epsilon$, $V_0$ and T, the burst mode may be obtained without excitation current $I_{ex}$ when the circuit is unstable.

Figure 21:
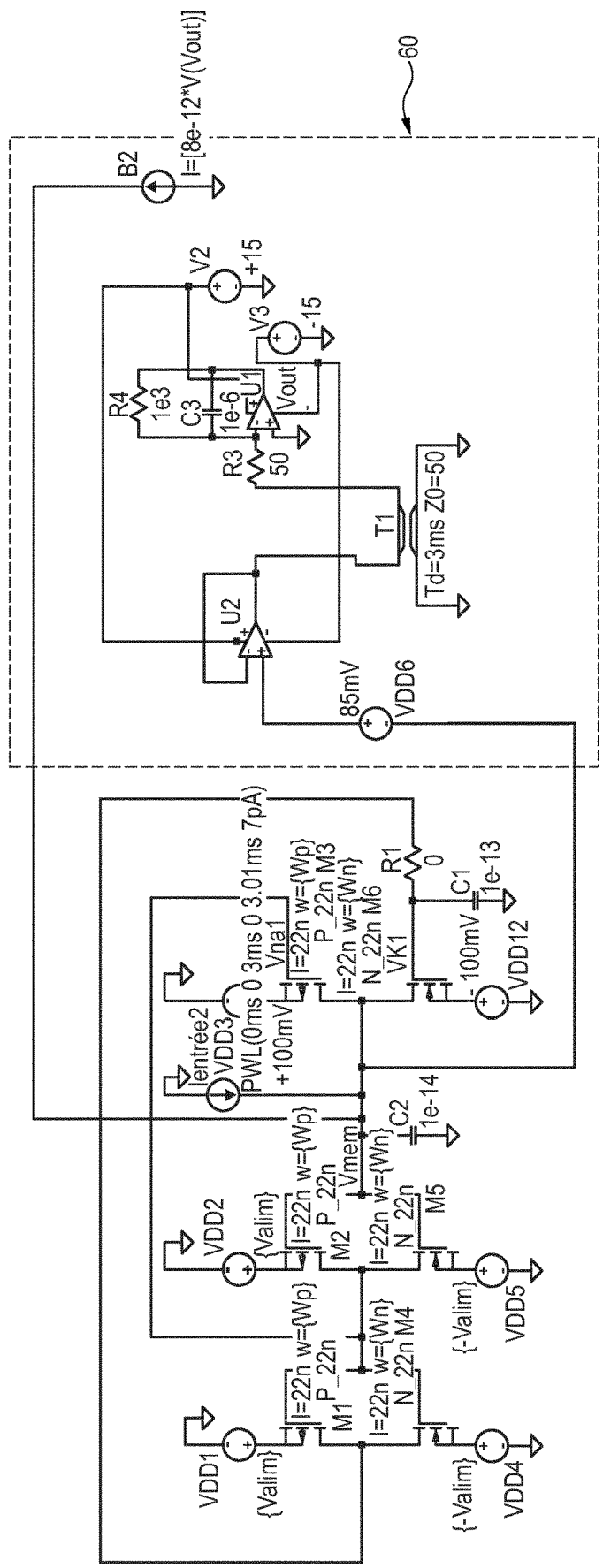
FIG. 21 shows a Spice digital simulation diagram for the circuit of FIG. 20.

The excitation circuit 60 of FIG. 20 may comprise a follower amplifier, a delay line T and an integrating amplifier, as shown on the Spice simulation diagram of FIG. 21. The source B2 on this diagram corresponds to a transconductance allowing the current to be obtained that is to be reinjected into the membrane capacitor on the basis of the voltage $V_{out}$ at the output of the integrating amplifier.

Figure 22A:
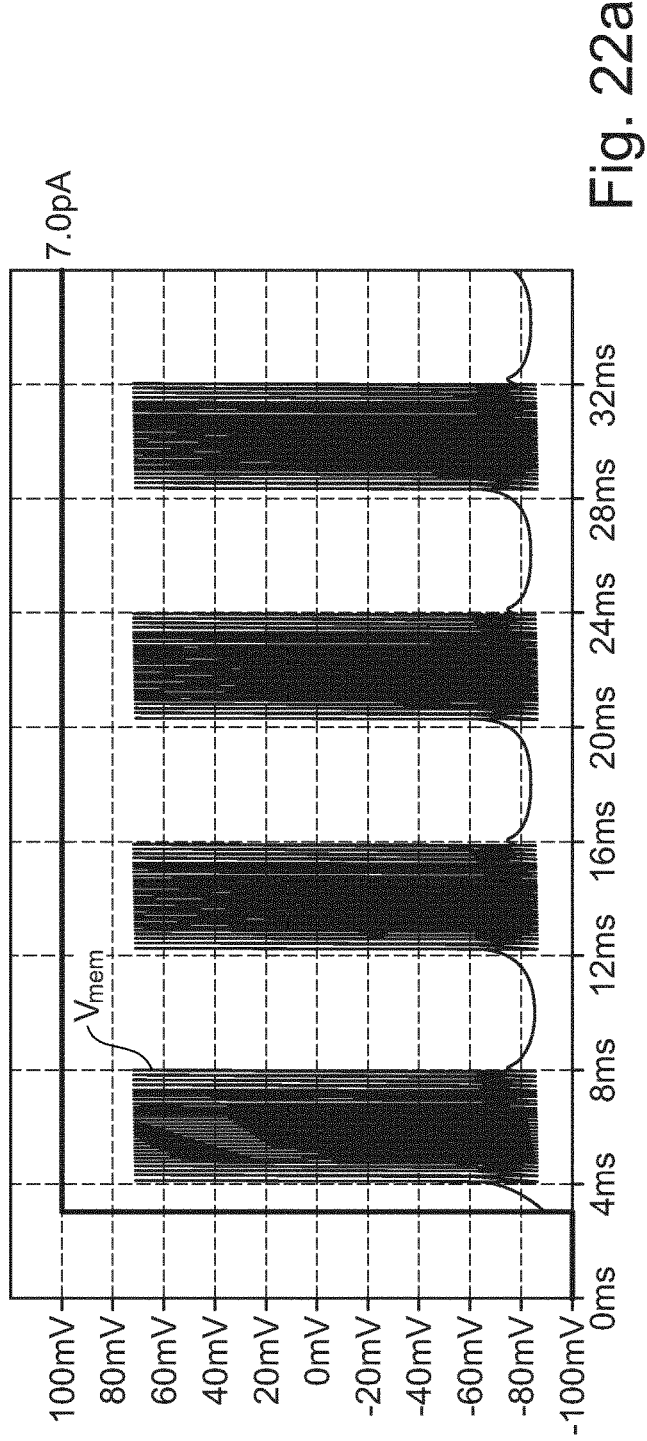
FIGS. 22a and 22b show bursts of pulses obtained at the output of the neuron with and without an external excitation current, respectively.
Figure 22B:
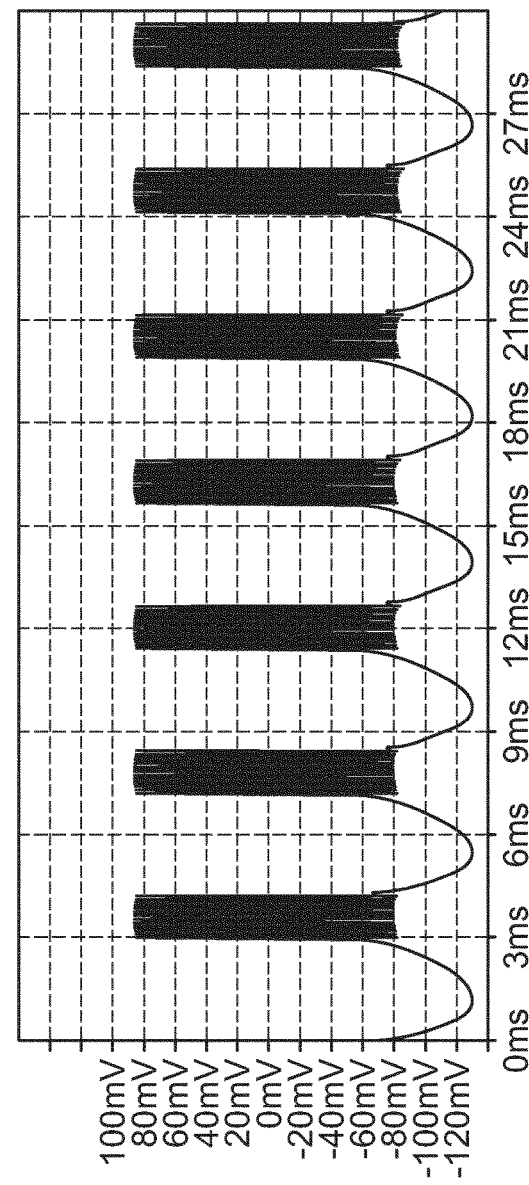

FIG. 22a shows the burst pulses generated with an external excitation step current at 7 pA. These burst pulses that are obtained without an external excitation current are shown in FIG. 22b.

Figure 12:
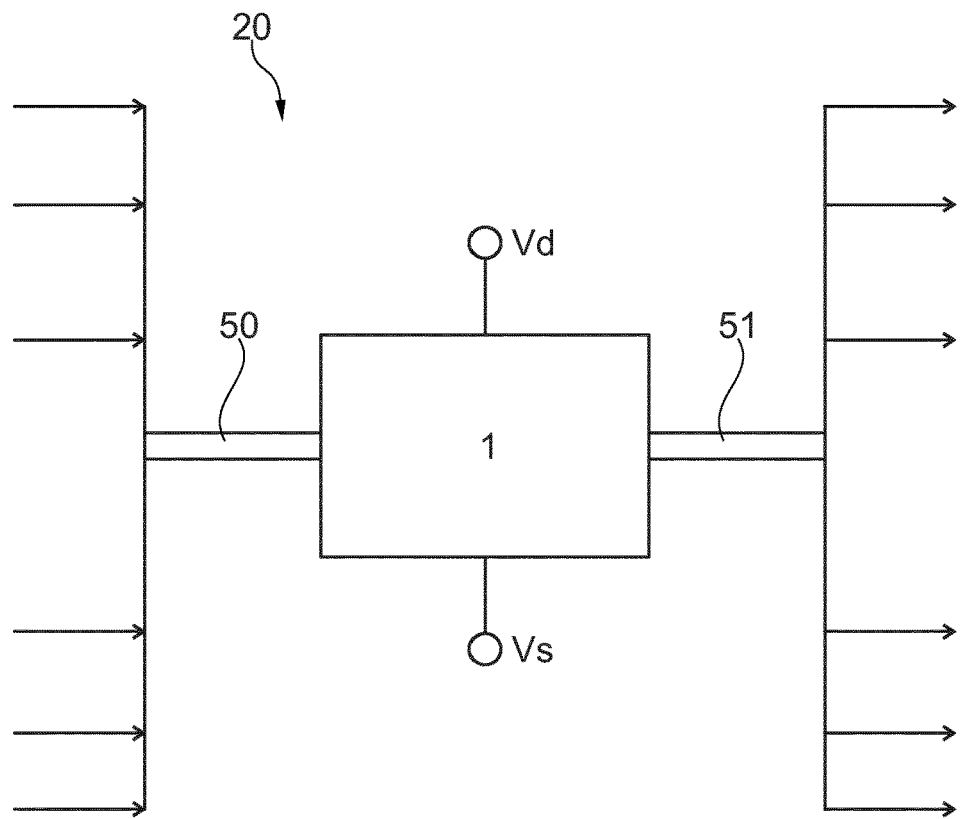
FIG. 12 schematically shows part of a neural network using an artificial neuron according to the invention.

An example of the integration of an artificial neuron according to the invention into a neuromorphic system is schematically shown in FIG. 12. In a complete system for bioinspired data processing, called neural network 20, the artificial neuron 1 is connected to the input by a dendrite tree 50, which produces the excitation current $I_{ex}$. The neuron produces a spike as a function of this current, which spike is transmitted to the output synapses 4 via an axon and a dendritic tree 51.

Figure 13:
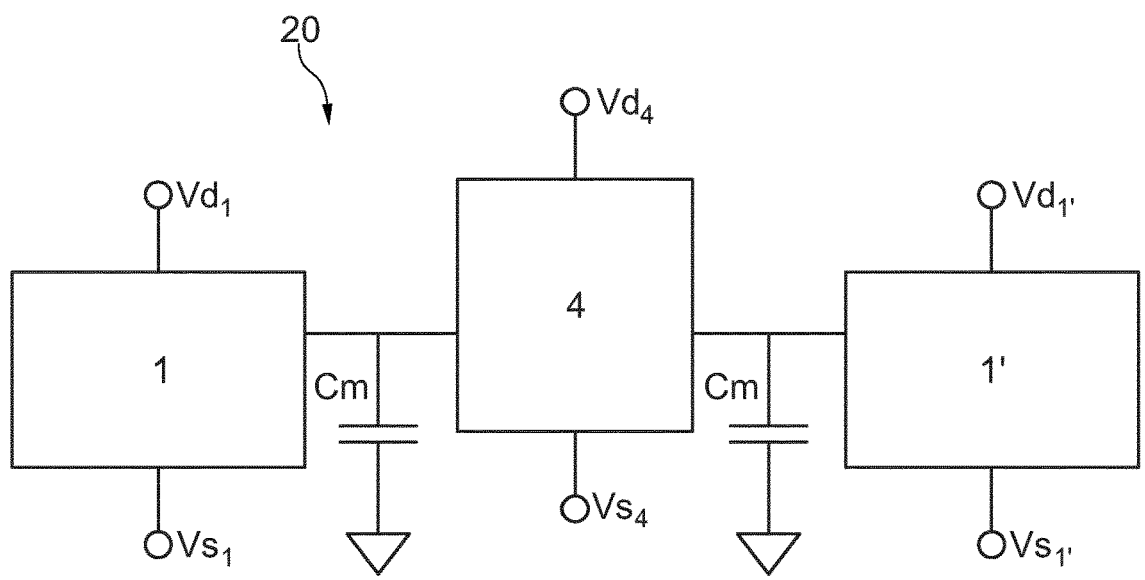
FIG. 13 schematically shows an interconnection of two neurons according to the invention by means of a synaptic circuit.

The interconnection of two neurons, schematically shown in FIG. 13, is made by means of a synaptic circuit 4.

As the synapses are plastic (their effect varies as a function of the pre- and post-neuron activities), their plasticity is represented by a synaptic weight (modeled by the "weight" gate potential on an NMOS control transistor). This synaptic weight is assumed known, being defined by a learning sequence or generated by an appended circuit (Spike Timing Dependent Plasticity circuit, for example).

Figure 14:
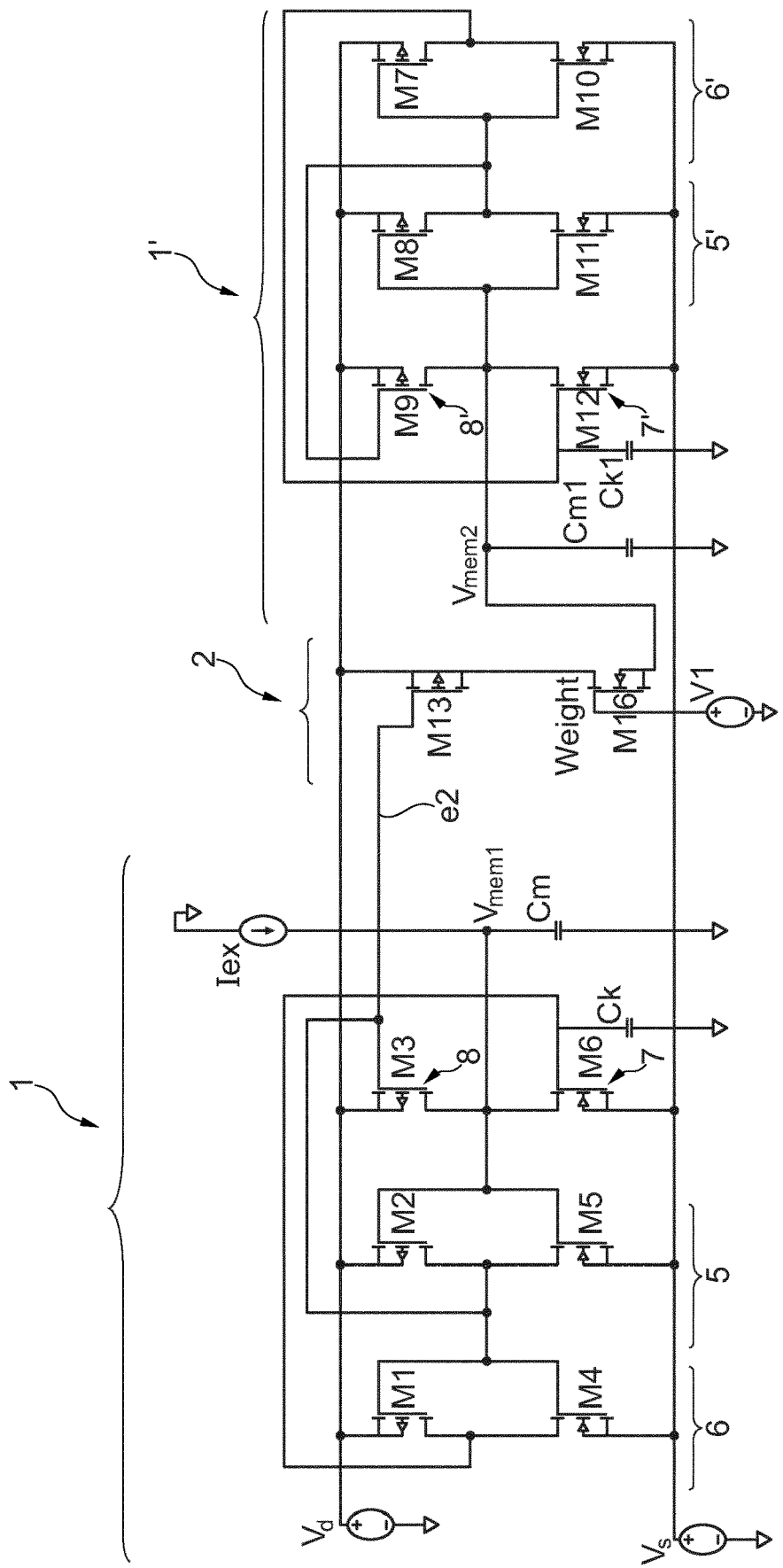
FIG. 14 shows a digital simulation circuit of the interconnection of FIG. 13 in the case of an excitatory synapse.
Figure 15:
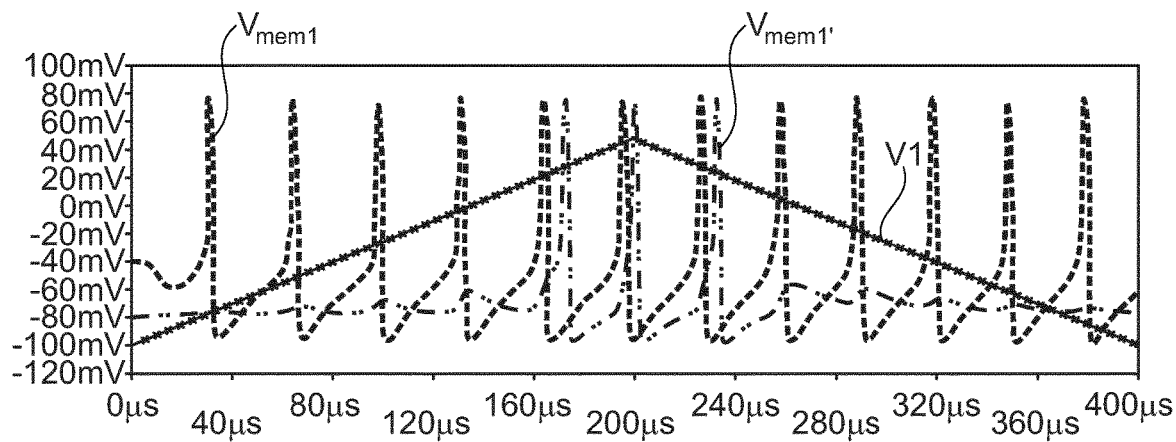
FIG. 15 shows the results obtained by the digital simulation of the circuit of FIG. 14.

FIG. 14 shows a simulation circuit associating two neurons 1, 1' by an excitatory synapse 2. The pre-neuron 1 is subject to a constant excitation current $I_{ex}$, periodically producing spikes, shown in FIG. 15 (curve $V_{mem1}$). This membrane potential $V_{mem1}$ attacks the synapse 2, following inversion by the inverter 5, on the gate of the PMOS transistor M3 connected to the second input e2 of the synapse 2. The current delivered to the post-neuron 1' is controlled by the potential $V_1$, which in this case is variable, applied to the "weight" gate of the NMOS transistor M16, and shown in FIG. 15. For the highest synaptic weights, a spike $V_{1'}$ is generated by the post-neuron 1' for each pulse of the pre-neuron (curve $V_{mem1'}$ of FIG. 15).

Figure 17:
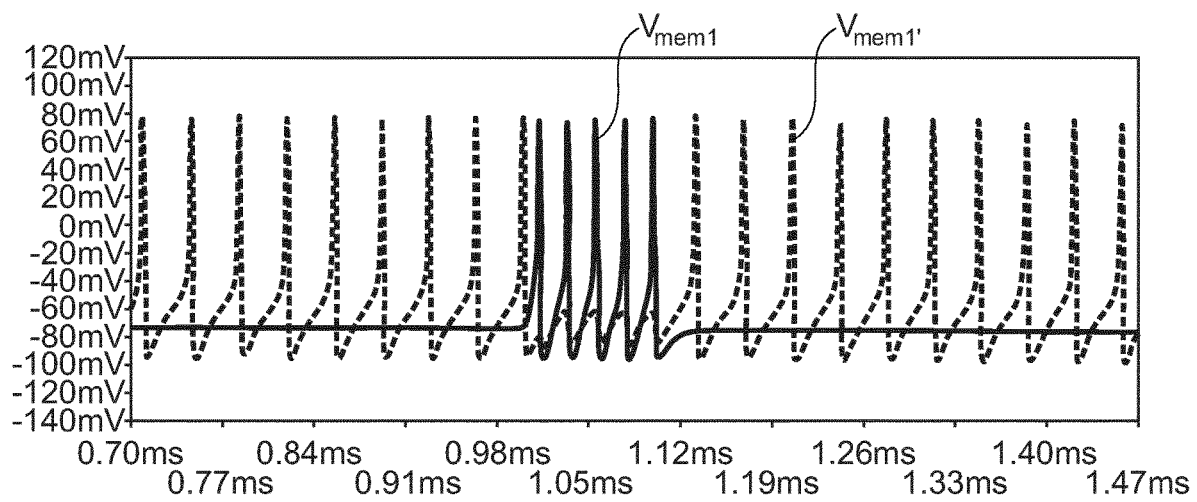
FIG. 17 shows the results obtained by the digital simulation of the circuit of FIG. 16.
Figure 16:
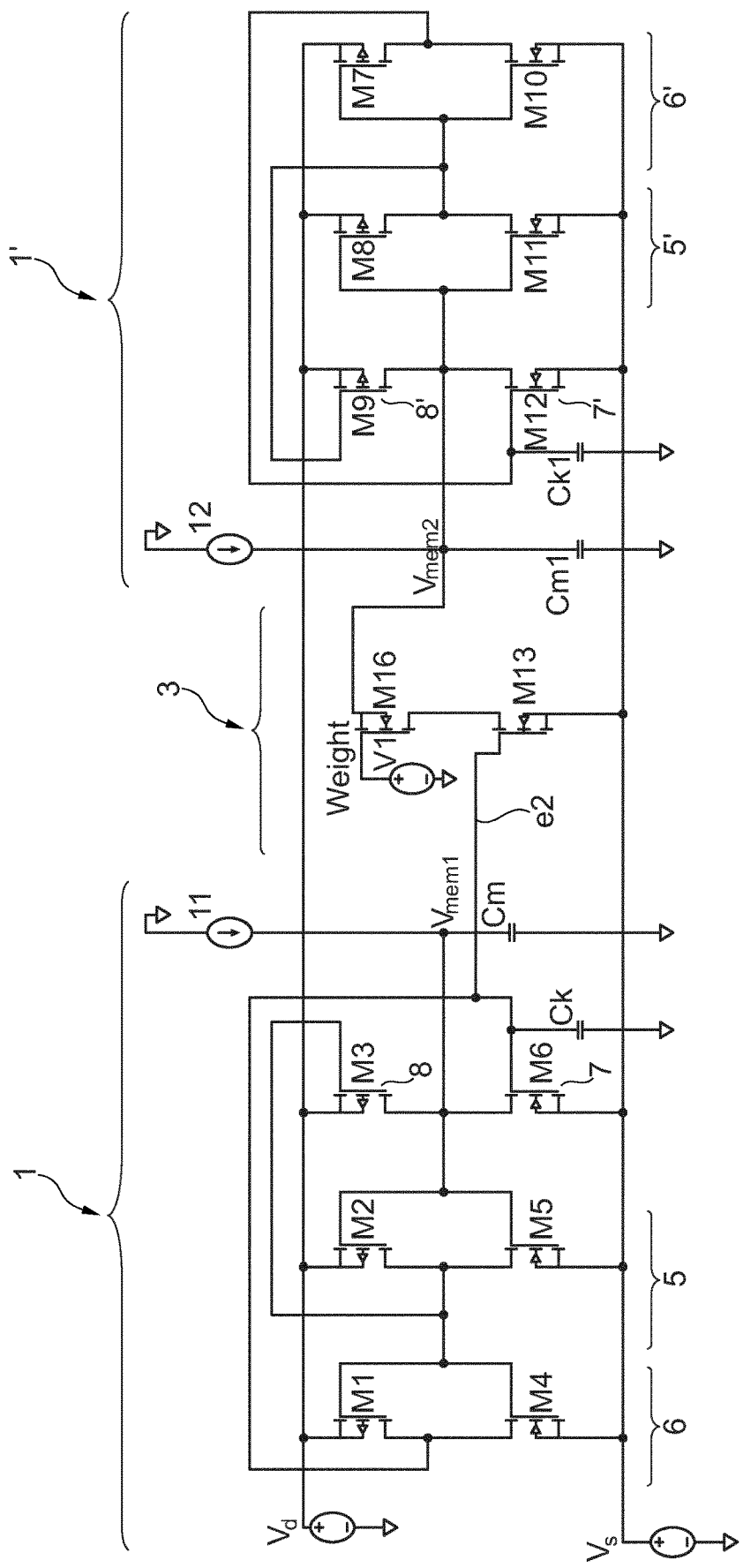
FIG. 16 shows a digital simulation circuit similar to that of FIG. 14 in the case of an inhibitory synapse.

FIG. 16 shows the case of an inhibitory synapse 3 connecting the two neurons 1, 1'. The post-neuron 1' is excited by a constant current I2 and it periodically produces pulses. The pre-neuron 1 is excited by a constant current I1 only within the time interval lying between 1 ms and 1.1 ms, where it produces 5 spikes (curve $V_{mem1}$ of FIG. 17). The inhibitory synapse 3 blocks the spikes of the post-neuron in this time interval (curve $V_{mem1'}$ of FIG. 17).

Figure 18:
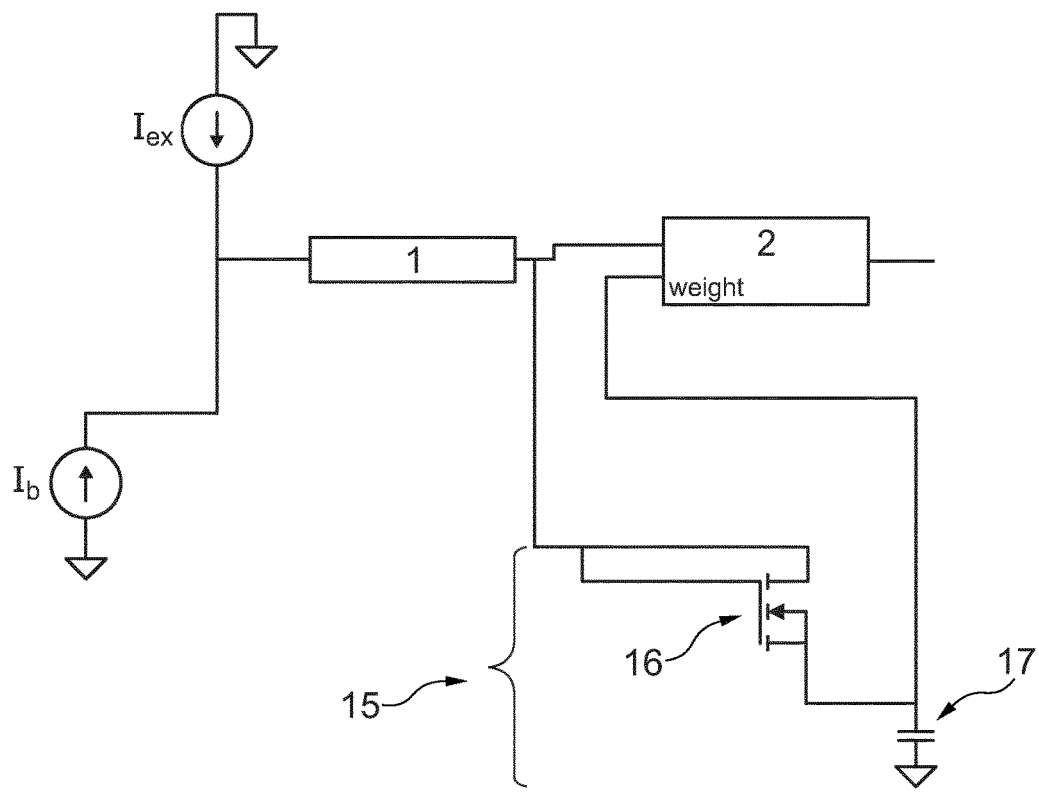
FIG. 18 schematically shows a circuit using the thermal noise of the neuron to maintain the synaptic weight of an excitatory synapse.
Figure 19:
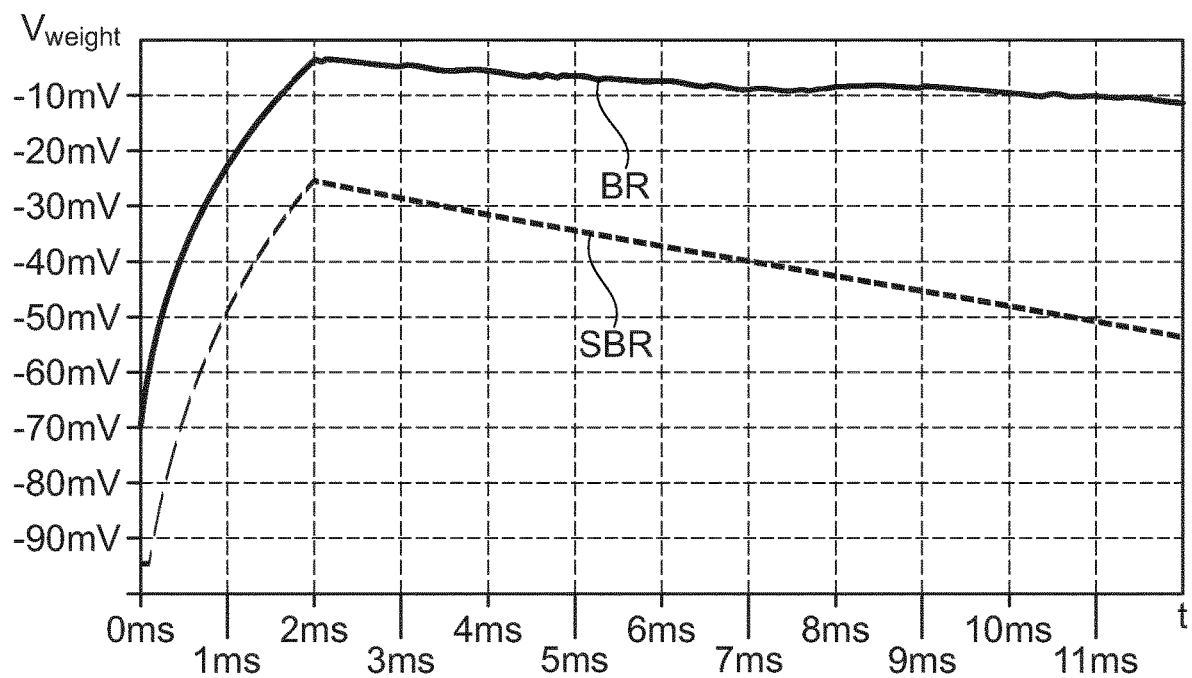
FIG. 19 shows the synaptic weight curves obtained by the simulation of the circuit of FIG. 18, with and without noise injection.

FIGS. 18 and 19 show the role played by the intrinsic thermal noise of the neuron injected at the input of the circuit for maintaining the synaptic weight.

The considered case is that of HF LTP (High-Frequency Long Term Potentiation), where multiple very high frequency spikes are applied to the input of an integrator, the output of which is connected to the input of the weight of a synaptic circuit.

FIG. 18 shows an integrating circuit 15 comprising an NMOS transistor 16 and a capacitor 17. The output of the integrator is connected to the "weight" input of an excitatory synapse 2. The HF pulses are obtained by applying a constant current $I_{ex}$ maintaining the excitation of the pre-neuron 1 during the first two milliseconds. In FIG. 18, Ib denotes the synaptic noise current.

FIG. 19 shows the potential of the synaptic weight ($V_{weight}$) with and without noise injection. It can be seen that the synaptic weight increases (learning by integration) until pulses are stopped at 2 ms, which is expressed by a reduction in the weight (by relaxation). Adding noise (curve BR) allows the relaxation phenomenon to be reduced while maintaining the high value of the weight for longer. The curve SBR represents the potential of the synaptic weight in the absence of noise.

Figure 22C:
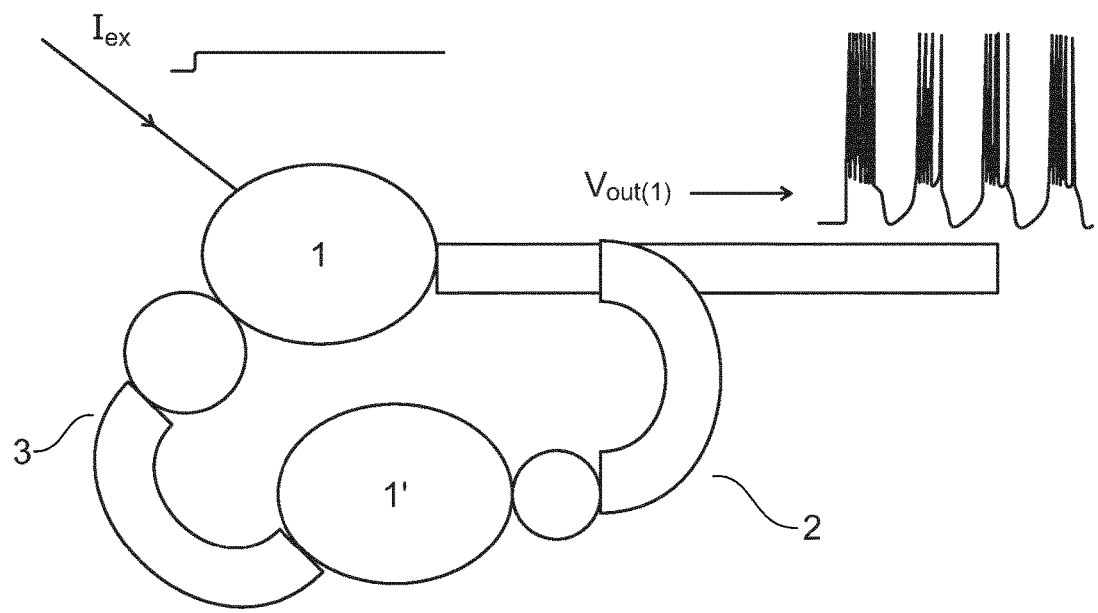
FIG. 22c shows an artificial neural network composed of two neurons coupled by two synapses, allowing one of the neurons to emit bursts of pulses.

FIG. 22c schematically shows a neural network composed of two neurons 1, 1' coupled by means of two synapses, one of which is an excitatory synapse 2 from the first neuron 1 to the second neuron 1', and the other one of which is an inhibitory synapse 3 from the second neuron 1' to the first neuron 1.

Another possibility for obtaining the burst mode is to rely on this type of coupling between neurons 1, 1' with different oscillation frequencies. The first neuron 1, which must oscillate at a higher frequency than the second neuron 1', has membrane $C_{m1}$ and delay $C_{k1}$ capacitance values, for example, with two orders of magnitude that are lower than those $C_{m1'}$ and $C_{k1'}$ of the second neuron 1'.

A step current applied to the input of the first neuron generates a pulse train. These pulses generate an excitatory synaptic current at the input of the second neuron via the excitatory synapse 2, thus depolarizing the second neuron.

When the second neuron depolarizes, it generates a pulse train generating an inhibitor synaptic current at the input of the first neuron via the inhibitory synapse 3, thus hyperpolarizing the first neuron and stopping its pulses.

Given the various oscillation frequencies of the two neurons, high-frequency oscillations are obtained at the output of the first neuron, corresponding to pulse bursts.

Figure 22D:
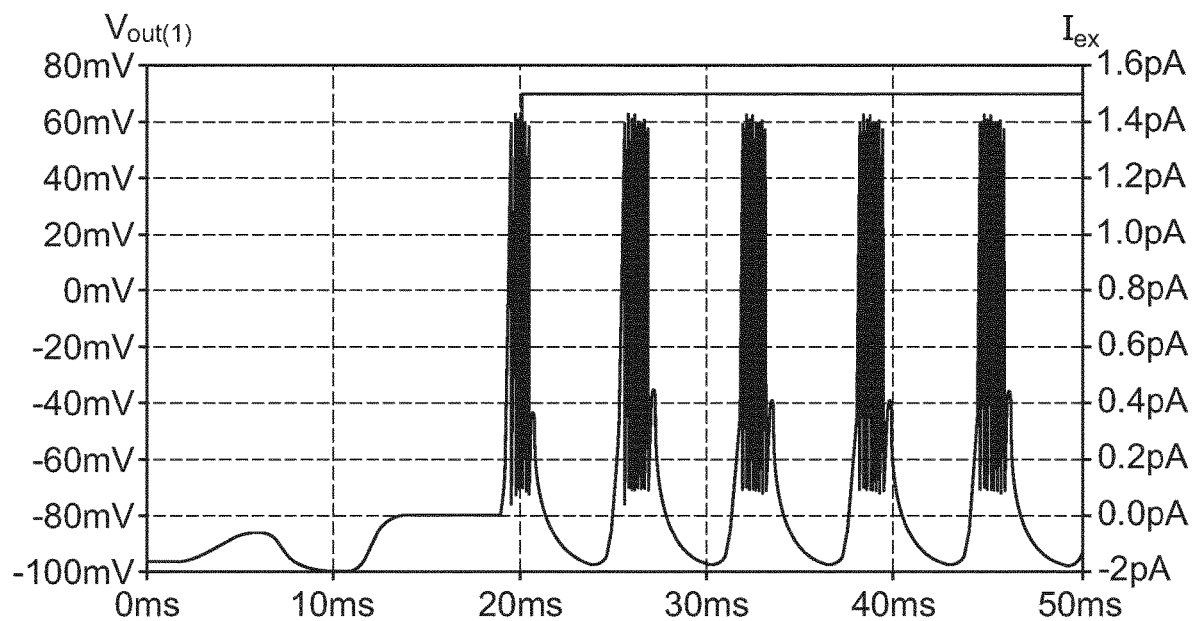
FIG. 22d shows the results obtained by the digital simulation of the circuit schematically shown in FIG. 22c.

FIG. 22d shows these pulse bursts ($V_{out}(1)$) obtained following a step current of 1.5 pA. It is to be noted that the pulses are obtained for a minimum excitation current of 0.4 pA. The frequency of the observed pulses increases with the amplitude of the current. In order to obtain the results of FIG. 22d, the power supply voltages of the neurons and synapses are −0.1 V and 0.1 V. The gate widths of the transistors of the inverters equal 120 nm.

Figure 23:
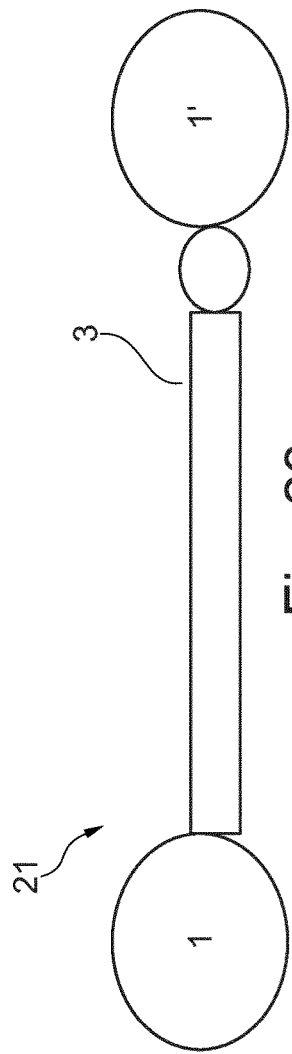
FIG. 23 schematically shows an artificial central pattern generator composed of two neurons and an inhibitory synapse.

FIG. 23 schematically shows an artificial central pattern generator 21 composed of two neurons, a pre-neuron 1 previously set to burst mode, connected to a post-neuron 1' set to oscillating mode via an inhibitory synapse 3.

The pre-neuron 1 controls the post-neuron 1'. Indeed, when it emits pulses, the pre-neuron 1 creates an inhibitor synaptic current at the input of the post-neuron 1', so as to prevent said neuron from oscillating. During the hyperpolarization phase of the pre-neuron 1 (absence of pulses), with the inhibitor synaptic current being insufficient, the post-neuron 1' oscillates normally as if it was isolated.

Figure 24:
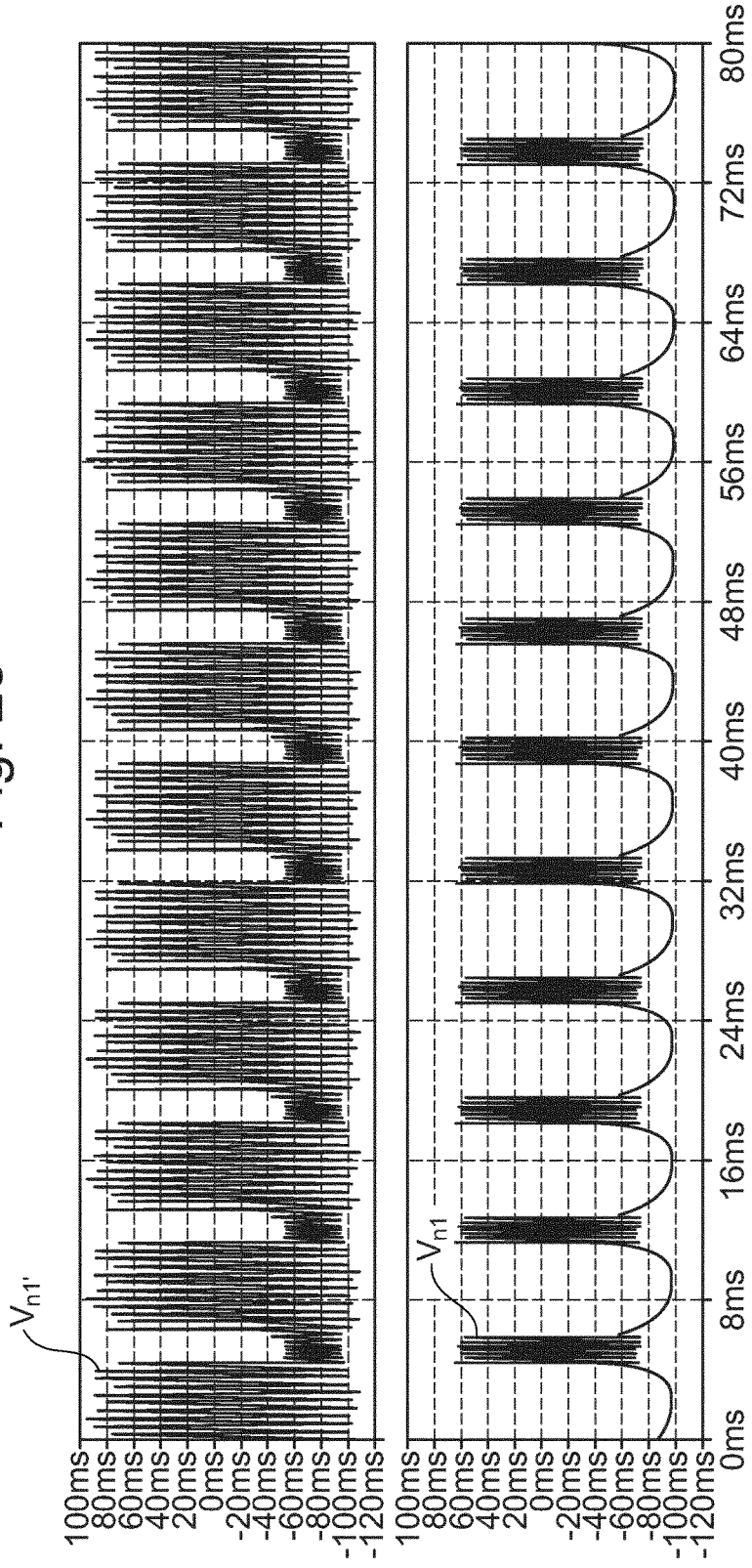
FIG. 24 shows the results obtained by digital simulation of the circuit of FIG. 23.

FIG. 24 shows the wave forms at the output of the pre-neuron ($V_{n1}$) and of the post-neuron ($V_{n1'}$).

Figure 25:
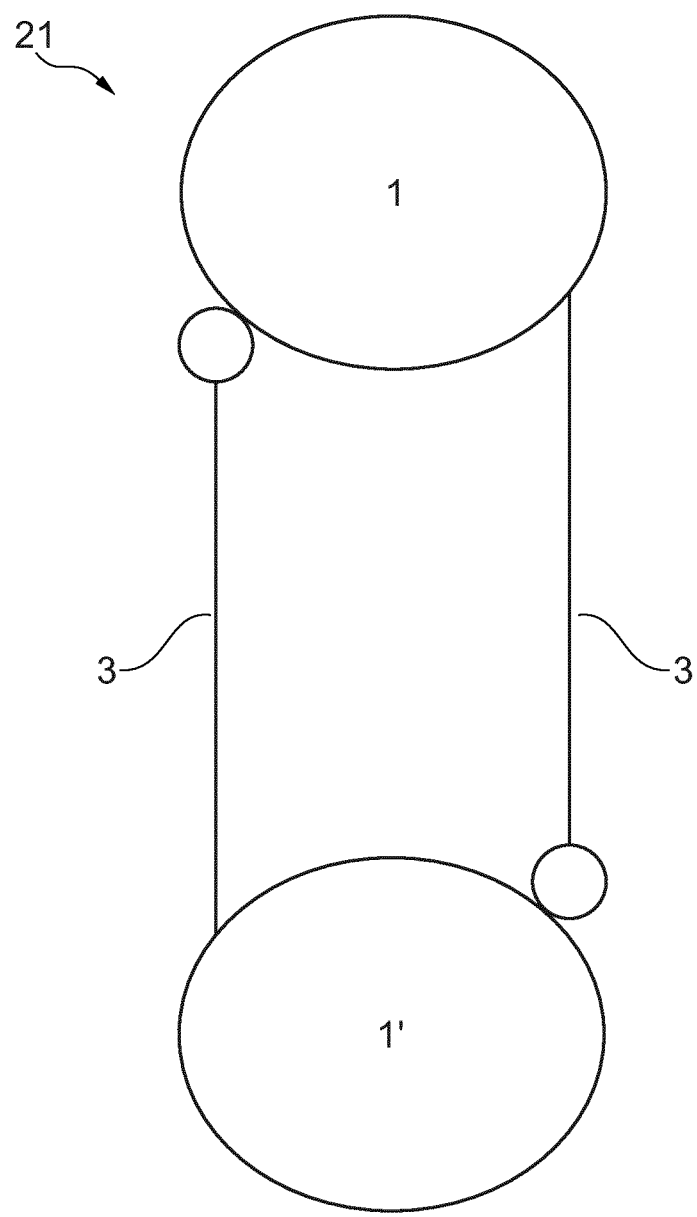
FIG. 25 schematically shows an artificial central pattern generator composed of two neurons and two inhibitory synapses.

FIG. 25 schematically shows a central pattern generator 21 composed of two neurons 1, 1' with identical characteristics, coupled together by means of two inhibitor synapses 3 of the same weight, so as to mutually inhibit one another.

Two cases occur: either the two neurons are previously set to oscillating mode or they are both previously set to burst mode.

Figure 26A:
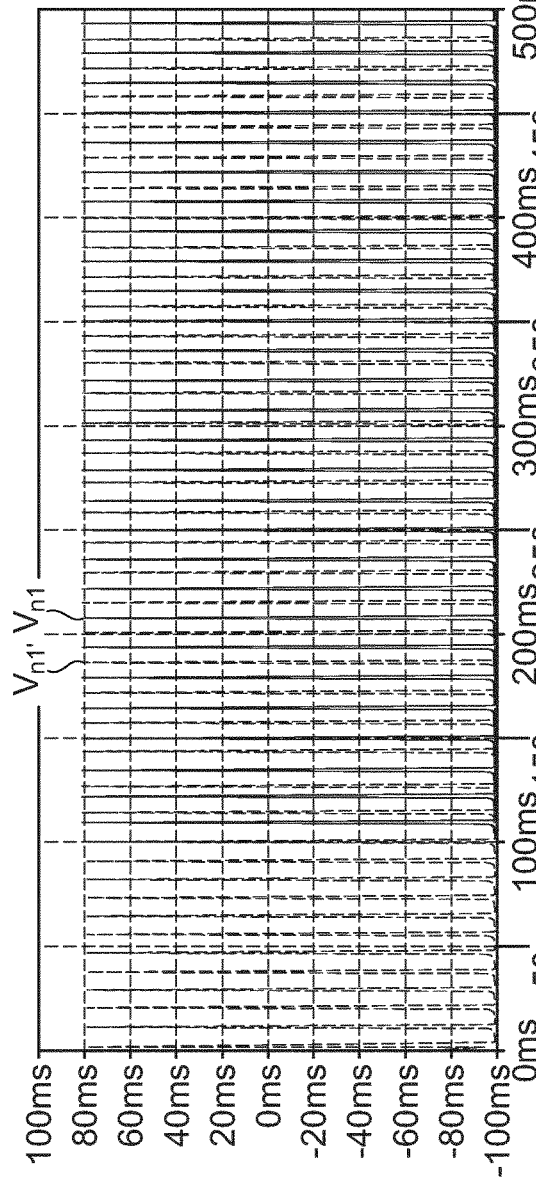
FIGS. 26a and 26b show the results obtained by the digital simulation of the circuit schematically shown in FIG. 25.

FIG. 26a shows the wave forms at the output of the two neurons 1, 1', in the event that the two neurons are previously set to oscillating mode. It can be seen that, at the end of 150 ms, their oscillations occur in an alternated manner.

Figure 26B:
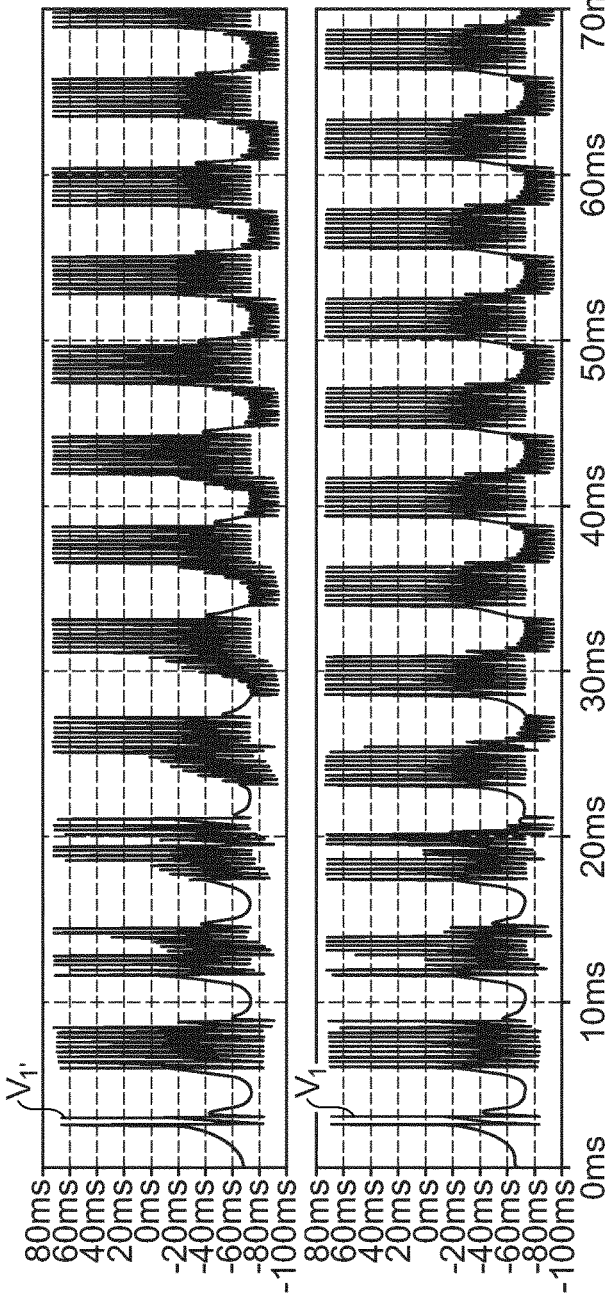

FIG. 26b shows the wave forms at the output of the two neurons 1, 1', in the event that the two neurons are previously set to burst mode. It can be seen that the synchronization resulting in alternated burst mode operation of the two neurons 1, 1' is obtained at the end of approximately fifty ms.

The present invention may be used in at least two fields.

The artificial neuron according to the invention may be used as a building block in neuroinspired systems for data processing, particularly for processing images, video and for facial recognition. In this case, the elements of the neural circuit will be optimized for high speed and/or very low dissipated power.

Furthermore, the neuron according to the invention may be used in biomedical applications, as an artificial biological neuron (implant). In this case, the elements of the circuit are optimized to faithfully reproduce the spike of the biological neurons.

The invention claimed is:

1. An artificial neuron comprising:
   a capacitor as a membrane capacitor;
   an input as an external synaptic excitation current, the membrane capacitor integrating the input current;
   a negative feedback pulse circuit supplied by a power supply at a negative voltage between −200 mV and 0 mV and at a positive voltage between 0 mV and +200 mV, consisting of:
      a bridge based on PMOS and NMOS transistors in series and connected, at drains thereof, by a midpoint to the membrane capacitor, the midpoint defining an output of the artificial neuron; and
      at least one capacitor as a delay capacitor, between a gate and a source of one of the transistors of the bridge;
   only two CMOS inverters connected in a cascade manner, each including two transistors, an input of a first one of the two CMOS inverters being directly connected to the membrane capacitor and an output of the first one of the two CMOS inverters being connected to an input of a second one of the two CMOS inverters and to a gate of one of the transistors of the bridge, an output of the second one of the two CMOS inverters being connected to a gate of the other transistor of the bridge; or
   only three CMOS inverters, with two of the three CMOS inverters being connected in a cascade manner, each including two transistors, an input of first one of the three CMOS inverters being connected to the membrane capacitor and an output of the first one of the three CMOS inverters being connected to an input of a second one of the three CMOS inverters, an output of the second one of the three CMOS inverters being connected to a gate of one of the transistors of the bridge, an input of a third one of the three CMOS inverters being connected to the membrane capacitor and an output of the third one of the three CMOS inverters being connected to a gate of the other transistor of the bridge.

2. The artificial neuron as claimed in claim 1, charging of the membrane capacitor being provided by the PMOS transistor of the bridge and discharging thereof being provided by the NMOS transistor.

3. The artificial neuron as claimed in claim 1, comprising two delay capacitances, a delay capacitance connected to the PM.OS transistor being lower than a delay capacitance connected to the NMOS transistor, with optimum being zero.

4. The artificial neuron as claimed in claim 3, the delay capacitance connected to the NMOS transistor being greater than the membrane capacitance.

5. The artificial neuron as claimed in claim 1, operating in stable mode, the PMOS and NMOS transistors of the bridge having different conductance values.

6. The artificial neuron as claimed in claim 1, operating in relaxation oscillator mode, the PMOS and NMOS transistors of the bridge having conductance values.

7. The artificial neuron as claimed in claim 1, the negative feedback pulse circuit being supplied by the power supply with a negative voltage between −100 mV and −50 mV and the positive voltage between +50 and +100 mV.

8. The artificial neuron as claimed in claim 1, a difference of the positive voltage minus negative voltage causing a voltage gain of each CMOS inverter to be greater than or equal to 2.

9. The artificial neuron as claimed in claim 1, a threshold voltage of at least one of the CMOS inverters being different from 0 V.

10. The artificial neuron as claimed in claim 1, comprising a leak resistor parallel to the membrane capacitor.

11. The artificial neuron as claimed in claim 1, the transistors of the bridge being produced using FD-SOI (Fully Depleted Silicon On Insulator) technology using possibility of control by a substrate, allowing maximum current of the transistors to be controlled by a substrate electrode.

12. The artificial neuron as claimed in claim 1, comprising an additional excitation circuit integrating a potential of the membrane and reinjecting a current resulting from the integration into the membrane capacitor, which additional excitation circuit has the midpoint of the transistors of the bridge as an input and output and comprises a follower amplifier, a delay line, an integrating amplifier, and a transconductance allowing the current to be obtained that is to be reinjected into the membrane capacitor on the basis of an output voltage of the integrating amplifier.

13. The artificial neuron as claimed in claim 1, using a stochastic resonance phenomenon through reception of an external excitation of two different currents: a periodic current with insufficient amplitude for generating spikes and a random noise current.

14. An artificial central pattern generator, comprising at least two artificial neurons as claimed in claim 1, as a pre-neuron and a post-neuron respectively, and an inhibitory synapse.

15. The artificial central pattern generator as claimed in claim 14, the inhibitory synapse including first and second synaptic inputs and including two transistors connected in series by drains thereof, at least one of the transistors being of NMOS type controlled by a gate potential corresponding to the first synaptic input, a gate of a second one of the transistors corresponding to the second synaptic input being connected to an output of two inverters in series, an input of the first inverter being subject to a membrane potential of the pre-neuron, an output of the synapse corresponding to the source of the NMOS transistor being connected to an output potential of the post-neuron.

16. The artificial central pattern generator as claimed in claim 14, the inhibitory synapse including first and second synaptic inputs and including two transistors connected in series by drains thereof, at least one of the transistors being of NMOS type controlled by a gate potential corresponding to the first synaptic input, a gate of a second one of the transistors corresponding to the second synaptic input being connected to a gate of the NMOS transistor of the bridge of the pre-neuron, an output of the synapse corresponding to the source of the NMOS transistor being connected to the output potential of the post-neuron.

17. The artificial central pattern generator as claimed in claim 14, comprising a pre-neuron operating in a burst mode and a post-neuron operating in an oscillating mode, associated by an inhibitory synapse.

18. The artificial central pattern generator as claimed in claim 14, comprising two artificial neurons both operating in an oscillating mode, and mutually coupled by two inhibitory synapses, so that each of the neurons is both a pre- and post-neuron.

19. The artificial central pattern generator as claimed in claim 14, comprising two artificial neurons both operating in a burst mode, and mutually coupled by two inhibitory synapses, so that each of the neurons is both a pre- and post-neuron.

20. A neural network comprising at least two artificial neurons, a pre-neuron and a post-neuron respectively, each comprising:
   a capacitor as a membrane capacitor;
   an input as an external synaptic excitation current, the membrane capacitor integrating the input current;
   a negative feedback pulse circuit supplied by a power supply at a negative voltage between −200 mV and 0 mV and at a positive voltage Vd between 0 mV and +200 mV, comprising:
      a bridge based on PMOS and NMOS transistors in series and connected, at drains thereof, by a midpoint to the membrane capacitor, the midpoint defining an output of the artificial neuron;
      at least one capacitor as a delay capacitor, between a gate and a source of one of the transistors of the bridge;
   only two CMOS inverters connected in a cascade manner, each including two transistors, an input of the first inverter being connected to the membrane capacitor and an output of the first inverter being connected to an input of the second inverter and to a gate of one of the transistors of the bridge, an output of the second inverter being connected to a gate of the other transistor of the bridge; or
   only three CMOS inverters, with two of the inverters being connected in a cascade manner, each including two transistors, an input of the first inverter being connected to the membrane capacitor and an output of the first inverter being connected to an input of the second inverter, an output of the second inverter being connected to a gate of one of the transistors of the bridge, an input of the third CMOS inverter being connected to the membrane capacitor and an output of the third CMOS inverter being connected to a gate of the other transistor of the bridge,
   the pre-neuron and the post-neuron being connected together by a synaptic circuit, and
   the synaptic circuit including two inputs and including two transistors connected in series by drains thereof, at least one of the transistors being of NMOS type controlled by a gate potential corresponding to a first input of the synaptic circuit, a gate of a second one of the transistors corresponding to a second input of the synaptic circuit, an output of the synaptic circuit corresponding to a source of the NMOS transistor being connected to an output potential of the post-neuron.

21. The neural network as claimed in claim 20, the synaptic circuit corresponding to an excitatory synapse, wherein a second input of the synaptic circuit is connected to an output of an inverter, having a membrane potential of the pre-neuron as an input.

22. The neural network as claimed in claim 20, the synaptic circuit corresponding to an inhibitory synapse, wherein a second input of the synaptic circuit is connected to an output of two inverters in series, with an input of the first inverter being subject to a membrane potential of the pre-neuron.

23. The neural network as claimed in claim 20, the synaptic circuit corresponding to an inhibitory synapse, wherein the second input of the synaptic circuit is connected to a gate of the NMOS transistor of the bridge of the pre-neuron.

24. The neural network as claimed in claim 20, comprising two artificial neurons, including a first neuron oscillating at a higher frequency and a second neuron oscillating at lower frequency, the first neuron operating in a burst mode by being coupled to the second neuron by two synapses, one of which is an excitatory synapse from the first neuron to the second neuron, and the other one of which is an inhibitory synapse from the second neuron to the first neuron.

25. The neural network as claimed in claim 24, membrane and delay capacitances of the second neuron being at least 100 times larger than those of the first neuron.

26. A data processing method, wherein a neural network is used as defined in claim 20.

27. The method as claimed in claim 26, wherein an intrinsic thermal noise of the artificial neuron is injected at the input thereof.

28. The method as claimed in claim 27, wherein multiple frequency spikes at an output of the artificial neuron are applied to an input of an integrating circuit, an output of which is connected to a first input of an excitatory synapse, a second input thereof being connected to the artificial neuron.

29. The method as claimed in claim 28, wherein the integrating circuit comprises an NMOS transistor, a source of which, corresponding to an output of the integrating circuit, is connected to a capacitor, a gate and drain of the transistor being connected together and corresponding to an input of the integrating circuit.

30. An artificial neuron comprising:
   a capacitor as a membrane capacitor;
   an input as an external synaptic excitation current, the membrane capacitor integrating the input current;
   a negative feedback pulse circuit supplied by a power supply at a negative voltage between −200 mV and 0 mV and at a positive voltage Vd between 0 mV and +200 mV, comprising:
      a bridge based on PMOS and NMOS transistors in series and connected, at drains thereof, by a midpoint to the membrane capacitor, the midpoint defining an output of the artificial neuron;
      at least one capacitor as a delay capacitor, between a gate and a source of one of the transistors of the bridge;
   only three CMOS inverters, with two of the inverters being connected in a cascade manner, each including two transistors, an input of the first inverter being connected to the membrane capacitor and an output of the first inverter being connected to an input of the second inverter, an output of the second inverter being connected to a gate of one of the transistors of the bridge, an input of the third CMOS inverter being connected to the membrane capacitor and an output of the third CMOS inverter being connected to a gate of the other transistor of the bridge.

* * * * *